(12) United States Patent
Chou et al.

(10) Patent No.: US 10,757,437 B2
(45) Date of Patent: Aug. 25, 2020

(54) MOTION ESTIMATION IN BLOCK PROCESSING PIPELINES

(71) Applicant: Apple Inc., Cupertino, CA (US)

(72) Inventors: Jim C. Chou, San Jose, CA (US); Mark P. Rygh, Union City, CA (US)

(73) Assignee: Apple Inc., Cupertino, CA (US)

( * ) Notice: Subject to any disclaimer, the term of this patent is extended or adjusted under 35 U.S.C. 154(b) by 748 days.

(21) Appl. No.: 14/334,614

(22) Filed: Jul. 17, 2014

(65) Prior Publication Data

US 2016/0021385 A1  Jan. 21, 2016

(51) Int. Cl.

| H04N 19/513 | (2014.01) |
|---|---|
| H04N 19/433 | (2014.01) |
| H04N 19/53 | (2014.01) |
| H04N 19/523 | (2014.01) |
| H04N 19/533 | (2014.01) |

(52) U.S. Cl.
CPC ......... *H04N 19/513* (2014.11); *H04N 19/433* (2014.11); *H04N 19/523* (2014.11); *H04N 19/53* (2014.11); *H04N 19/533* (2014.11)

(58) Field of Classification Search
CPC .. H04N 19/433; H04N 19/513; H04N 19/523; H04N 19/53; H04N 19/533
See application file for complete search history.

(56) References Cited

U.S. PATENT DOCUMENTS

| 8,149,915 | B1 * | 4/2012 | Novotny | H04N 19/53 375/240.16 |
|---|---|---|---|---|
| 8,189,678 | B2 | 5/2012 | Valmiki et al. | |
| 8,681,873 | B2 | 3/2014 | Bivolarsky et al. | |
| 8,705,630 | B2 | 4/2014 | Pappas et al. | |
| 2005/0207663 | A1 * | 9/2005 | Zeng | H04N 19/523 382/236 |
| 2005/0286777 | A1 * | 12/2005 | Kumar | H04N 19/00 382/232 |
| 2008/0159401 | A1 * | 7/2008 | Lee | H04N 19/52 375/240.16 |

(Continued)

FOREIGN PATENT DOCUMENTS

| WO | 2013067938 | 5/2013 |
|---|---|---|
| WO | 2014009864 | 1/2014 |
| WO | 2014054896 | 4/2014 |

OTHER PUBLICATIONS

U.S. Appl. No. 14/037,318, filed Sep. 25, 2013, Marc A. Schaub.

(Continued)

*Primary Examiner* — Md N Haque
(74) *Attorney, Agent, or Firm* — Robert C. Kowert; Kowert, Hood, Munyon, Rankin & Goetzel, P.C.

(57) ABSTRACT

Block processing pipeline methods and apparatus in which motion estimation is performed at a stage of a motion estimation module for a current block with respect to a reference frame at one or more partition sizes to determine candidate motion vectors. The candidate motion vectors may be passed to a next stage for refinement. Motion estimation may then be performed at the next stage to refine the motion vectors. In performing motion estimation at this stage, the input motion vectors of at least one partition size received from the previous stage may be used as candidate motion vectors in searches for at least one other partition size.

22 Claims, 22 Drawing Sheets

(56) References Cited

U.S. PATENT DOCUMENTS

| | | | |
|---|---|---|---|
| 2008/0212675 A1* | 9/2008 | Ohgose | H04N 19/52 375/240.16 |
| 2008/0212676 A1* | 9/2008 | Liu | H04N 19/56 375/240.16 |
| 2008/0240246 A1* | 10/2008 | Lee | H04N 19/176 375/240.16 |
| 2009/0296813 A1 | 12/2009 | Garg et al. | |
| 2010/0166073 A1 | 7/2010 | Schmit et al. | |
| 2010/0195730 A1 | 8/2010 | Garg et al. | |
| 2011/0206110 A1 | 8/2011 | Bivolarsky et al. | |
| 2011/0206117 A1 | 8/2011 | Bivolarsky et al. | |
| 2013/0272413 A1 | 10/2013 | Seregin et al. | |
| 2013/0272421 A1 | 10/2013 | Takano et al. | |
| 2013/0301712 A1 | 11/2013 | Hsieh et al. | |
| 2013/0301742 A1* | 11/2013 | Cheung | H04N 19/733 375/240.29 |
| 2014/0254680 A1* | 9/2014 | Ho | H04N 19/196 375/240.16 |

OTHER PUBLICATIONS

U.S. Appl. No. 14/039,804, filed Sep. 27, 2013, Mark P. Rygh.
U.S. Appl. No. 14/037,316, filed Sep. 25, 2013, Craig M. Okruhlica, (non-final-rejection).
U.S. Appl. No. 14/039,820, filed Sep. 27, 2013, Guy Cote.
U.S. Appl. No. 14/039,764, filed Sep. 27, 2013, Timothy John Millet.
U.S. Appl. No. 14/037,313, filed Sep. 25, 2013, Joseph J. Cheng.
U.S. Appl. No. 14/039,729, filed Sep. 27, 2013, James E. Orr.
U.S. Appl. No. 14/037,310, filed Sep. 25, 2013, Guy Cote.

\* cited by examiner

MOTION ESTIMATION IN BLOCK PROCESSING PIPELINES

BACKGROUND

Technical Field

This disclosure relates generally to video or image processing, and more specifically to methods and apparatus for processing digital video frames in block processing pipelines.

Description of the Related Art

Various devices including but not limited to personal computer systems, desktop computer systems, laptop and notebook computers, tablet or pad devices, digital cameras, digital video recorders, and mobile phones or smart phones may include software and/or hardware that my implement a video processing method. For example, a device may include an apparatus (e.g., an integrated circuit (IC), such as a system-on-a-chip (SOC), or a subsystem of an IC, that may receive and process digital video input from one or more sources and output the processed video frames according to one or more video processing methods. As another example, a software program may be implemented on a device that may receive and process digital video input from one or more sources and output the processed video frames according to one or more video processing methods. As an example, a video encoder 10 as shown in FIG. 1 represents an apparatus, or alternatively a software program, in which digital video input (input frames 90) is encoded or converted into another format (output frames 92), for example a compressed video format such as H.264/Advanced Video Coding (AVC) format (also referred to as MPEG 4 Part 10), or H.265 High Efficiency Video Encoding (HEVC) format according to a video encoding method. An apparatus or software program such as a video encoder 10 may include multiple functional components or units, as well as external interfaces to, for example, video input sources and external memory.

In some video processing methods, to perform the processing, each input video frame 90 is divided into rows and columns of blocks of pixels (e.g., 16×16 pixel blocks), for example as illustrated in FIG. 2 which shows an example 192×192 pixel frame divided into 144 16×16 pixel blocks. Each block of an input video frame 90 is processed separately, and when done the processed blocks are combined to form the output video frame 92. This may be referred to as a block processing method. Conventionally, the blocks are processed by the block processing method in scan order as shown in FIG. 2, beginning at the first block of the first row of the frame (shown as block 0), sequentially processing the blocks across the row, and continuing at the first block of the next row when a row is complete.

A block processing method may include multiple processing steps or operations that are applied sequentially to each block in a video frame. To implement such a block processing method, an apparatus or software program such as a video encoder 10 may include or implement a block processing pipeline 40. A block processing pipeline 40 may include two or more stages, with each stage implementing one or more of the steps or operations of the block processing method. FIG. 1 shows an example video encoder 10 that implements an example block processing pipeline 40 that includes at least stages 42A through 42C. A block is input to a stage 42A of the pipeline 40, processed according to the operation(s) implemented by the stage 42A, and results are output to the next stage 42B (or as final output by the last stage 42). The next stage 42B processes the block, while a next block is input to the previous stage 42A for processing. Thus, blocks move down the pipeline from stage to stage, with each stage processing one block at a time and multiple stages concurrently processing different blocks. Conventionally, the blocks are input to and processed by the block processing pipeline 40 in scan order as shown in FIG. 2. For example, in FIG. 1, the first block of the first row of the frame shown in FIG. 2 (block 0) is at stage 42C, the second block (block 1) is at stage 42B, and the third block (block 2) is at stage 42A. The next block to be input to the block processing pipeline 40 will be the fourth block in the first row.

H.264/Advanced Video Coding (AVC)

H.264/AVC (formally referred to as ITU-T Recommendation H.264, and also referred to as MPEG-4 Part 10) is a block-oriented motion-compensation-based codec standard developed by the ITU-T (International Telecommunications Union—Telecommunication Standardization Sector) Video Coding Experts Group (VCEG) together with the ISO/IEC JTC1 Moving Picture Experts Group (MPEG). The H.264/AVC standard is published by ITU-T in a document titled "ITU-T Recommendation H.264: Advanced video coding for generic audiovisual services". This document may also be referred to as the H.264 Recommendation.

SUMMARY OF EMBODIMENTS

Embodiments of block processing methods and apparatus are described in which motion vectors that are determined at particular partition sizes at one stage of the module and passed to a next stage of the motion estimation module for refinement may be used as candidates or seeds for multiple partition sizes at the next stage. As an example, in the H.264 video coding standard, motion vector(s) estimated for 8×8 partitions at a stage (e.g., a full pixel stage) may be used as candidates for 8×8 partitions in the next stage (e.g., a subpixel stage), and may also be used as candidates for 16×8, 8×16, and/or 16×16 partitions in the stage.

In at least some embodiments, the motion estimation module may implement a hierarchical search algorithm, with each stage searching for motion vectors at a different, progressively finer resolution (e.g., low, full pixel, and subpixel resolutions). Motion estimation is performed at a stage of the motion estimation module (e.g., the full pixel stage) for a current block with respect to a reference frame at one or more partition sizes to determine candidate motion vectors. The candidate motion vectors may be passed to a next stage (e.g., the subpixel stage) for refinement. Motion estimation may then be performed at the next stage. In performing motion estimation at this stage, input motion vectors of at least one partition size received from the previous stage may be used as candidate motion vectors in searches for at least one other partition size. For example, 8×8 motion vectors may be used for searching for 16×16 partitions.

In at least some embodiments, a distortion metric may be calculated for each motion vector determined at a stage of the motion estimation module, and the distortion metrics may be passed to the next stage of the pipeline with the respective motion vectors. In some embodiments, the distortion metrics, and/or one or more other factors, may be used at a motion estimation stage in making motion estimation decisions, for example decisions about which of the candidate motion vectors input from the previous stage are to be used as seeds for searches, and at which partition sizes the motion vectors are to be used as seeds.

In some embodiments, the best motion vector for each partition size at a stage may be specified as the best motion vector for the largest partition, which may then be refined in the next stage. As an example, in the H.264 video coding standard, a first stage of a motion estimation module may find the best motion vectors for the 4×4, 4×8, 8×4, etc. partitions, and in a second stage, the best motion vectors at the various partition sizes may all be converted into candidates for 16×16 partitions.

Figure 1:
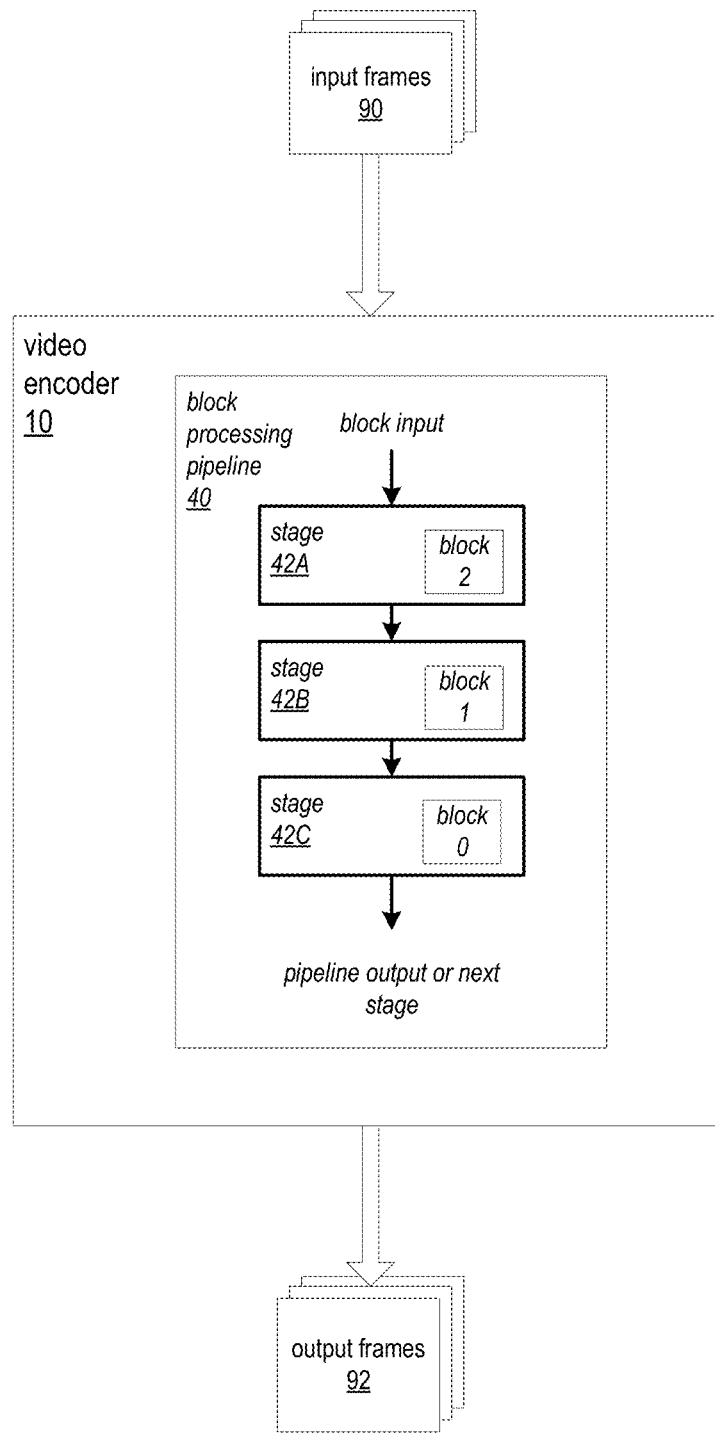
FIG. 1 illustrates an example video encoder including a conventional block processing pipeline that processes blocks from input frames in scan order.
Figure 2:
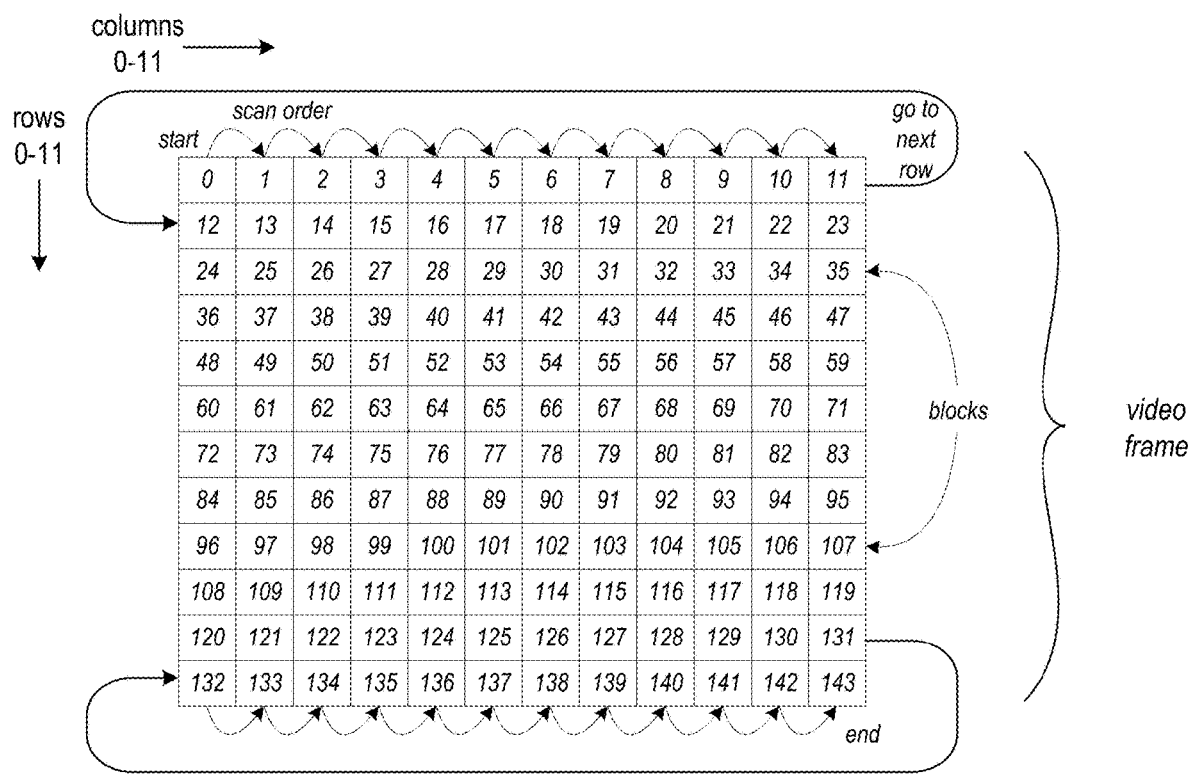
FIG. 2 illustrates conventional scan order processing of blocks from a video frame.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

DETAILED DESCRIPTION

Figure 18:
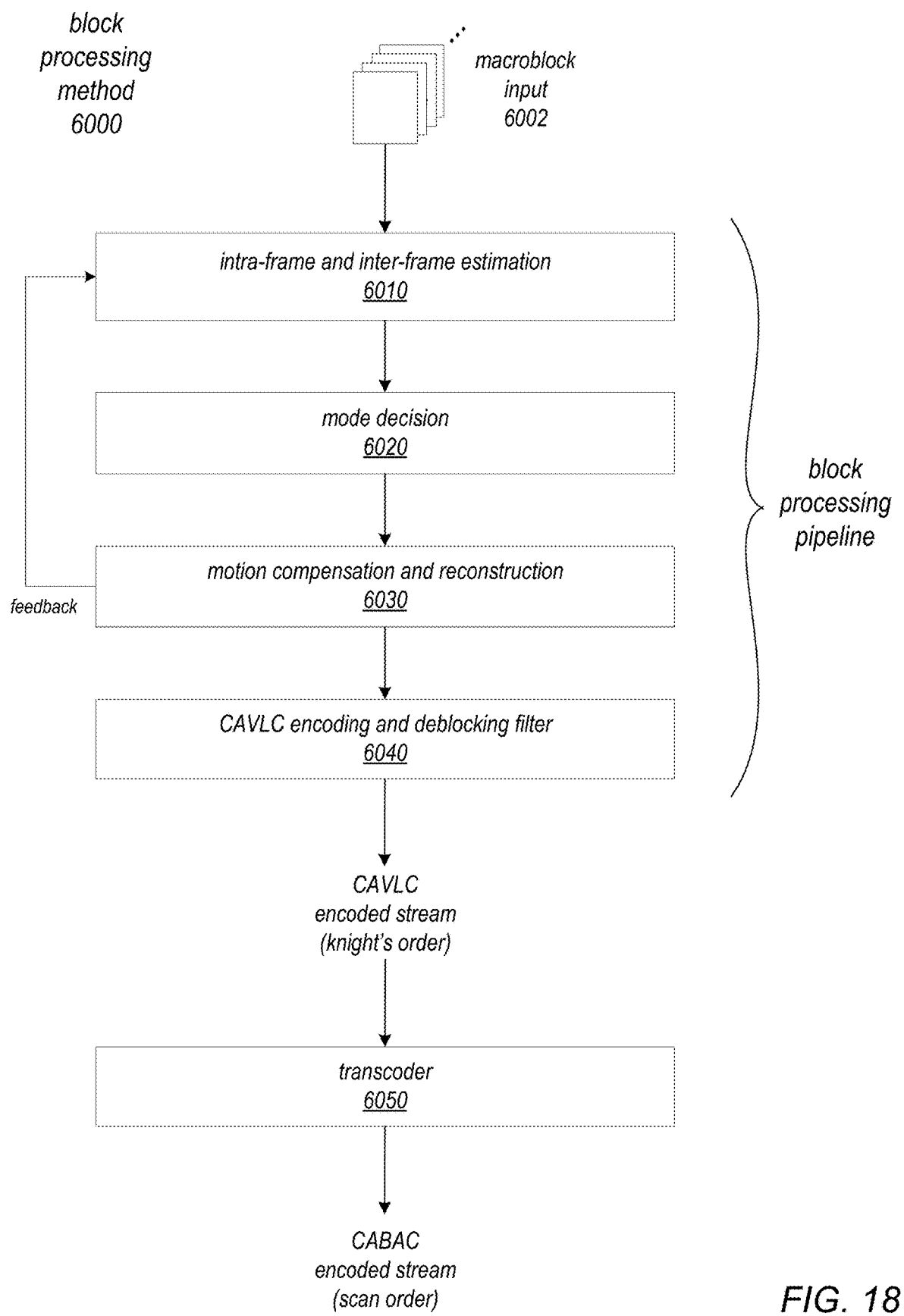
FIG. 18 is a high-level block diagram of general operations in an example block processing method that may be implemented by a block processing pipeline that implements one or more of the block processing methods and apparatus described herein, according to at least some embodiments.
Figure 19:
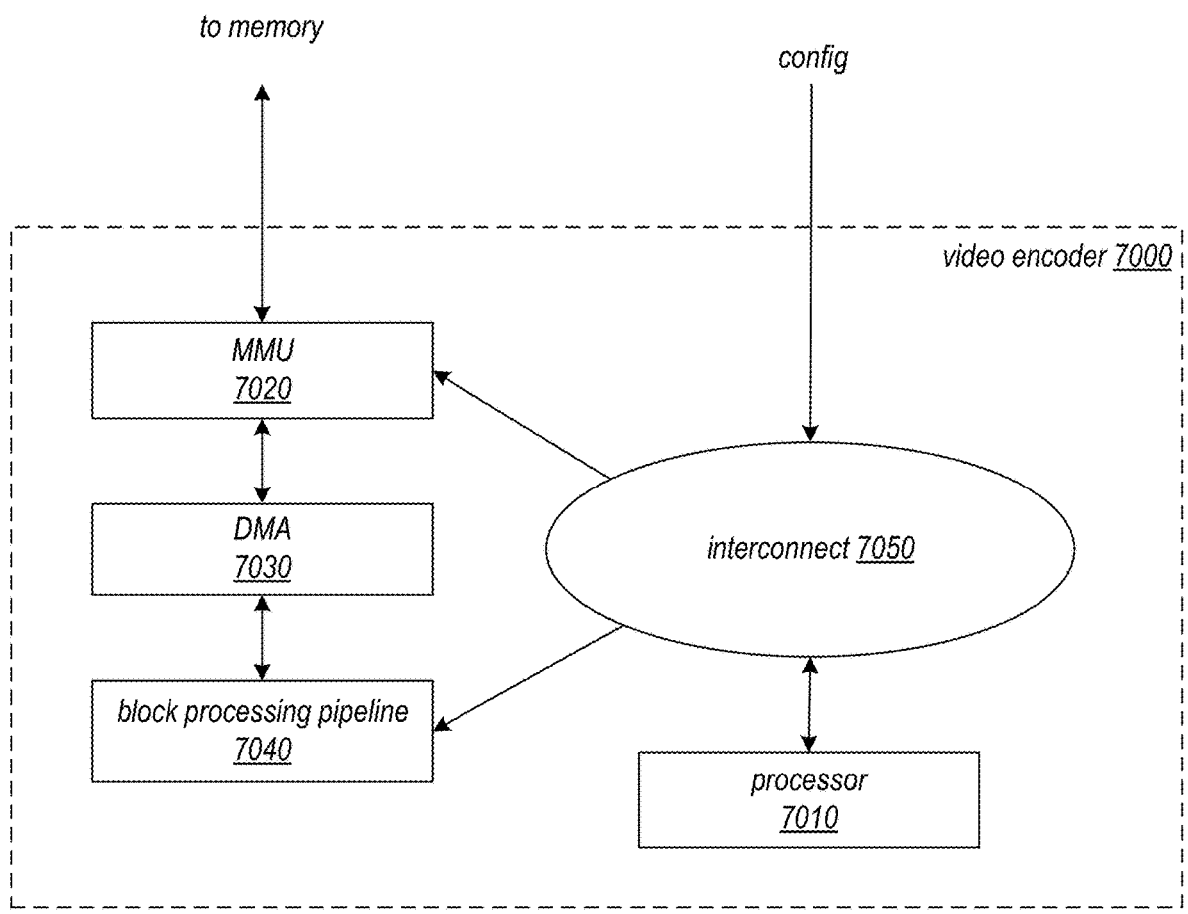
FIG. 19 is a block diagram of an example video encoder apparatus, according to at least some embodiments.

Various embodiments of methods and apparatus for processing digital video frames in block processing pipelines are described. Embodiments of block processing methods and apparatus are generally described herein in the context of video processing in which input video frames are subdivided into and processed according to blocks of elements (e.g., 16×16, 32×32, or 64×64 pixel blocks). Embodiments of an example H.264 video encoder that includes a block processing pipeline and that may implement one or more of the block processing methods and apparatus are described herein. The H.264 video encoder converts input video frames from an input format into H.264/Advanced Video Coding (AVC) format as described in the H.264/AVC standard (the H.264 Recommendation). FIG. 18 illustrates an example block processing pipeline of an example H.264 video encoder, and FIG. 19 illustrates an example H.264 video encoder that includes a block processing pipeline. However, embodiments of the block processing methods and apparatus may be used in encoders for other video encoding formats, for example in block processing pipelines of HEVC (High Efficiency Video Encoding) video encoders that convert input video frames from an input format into HEVC format as described in the HEVC standard. The HEVC standard is published by ITU-T in a document titled "ITU-T Recommendation H.265: High Efficiency Video Encoding". Other video encoders that may use embodiments of the block processing methods and apparatus may include, but are not limited to, H.263, MPEG-2, MPEG-4, and JPEG-2000 video encoders. However, it is to be noted that embodiments of the block processing methods and apparatus may be used in any block processing pipeline, including but not limited to block processing pipelines implemented in various other video encoders and/or decoders (which may be referred to as codecs) in which digital video frames input in one format are encoded or converted into another format. Further note that the block processing methods and apparatus as described herein may be used in software and/or hardware implementations of video encoders. In addition to video encoders/decoders, the block processing methods and apparatus described herein may be used in various other applications in which blocks from a video frame or still digital image are processed, for example in pipelines that process still digital images in various image processing applications. Thus, it is to be understood that the term frame or video frame as used herein may also be taken to refer to any digital image.

Embodiments of the block processing methods and apparatus as described herein may be implemented in two or more parallel block processing pipelines. For example, 2, 4, 8, or more pipelines may be configured to run in parallel, with each pipeline processing a quadrow from an input video frame, for example with blocks input according to knight's order.

Embodiments of the block processing methods and apparatus are generally described herein in the context of video processing in which input frames are subdivided into and processed according to blocks of picture elements (referred to as pixels, or pels), specifically 16×16 pixel blocks referred to as macroblocks that are used, for example, in H.264 encoding. However, embodiments may be applied in pipelines in which blocks of other sizes and geometries, or of other elements, are processed. For example, HEVC encoding uses blocks referred to as Coding Tree Units (CTUs) that may vary within the range of 16×16 pixel to 64×64 pixel. In some implementations such as H.264 encoders, the blocks input to the pipeline may be referred to as macroblocks, each macroblock including two or more blocks or partitions that may be processed separately at stages of the pipeline. For example, for input video frames encoded in YUV (e.g., YUV420 format) or YCbCr (e.g., YCbCr 4:2:0, 4:2:2 or 4:4:4 formats) color space, a macroblock may be composed of separate blocks of chroma and luma elements that may be processed separately at stages in a pipeline. In addition to applications that process frames in a pipeline according to blocks of elements (e.g., blocks of pixels), the block processing methods and apparatus may be applied in applications in which digital images (e.g., video frames or still images) are processed by single elements (e.g., single pixels).

Multiple Search Seeds in Motion Estimation

Figure 6A:
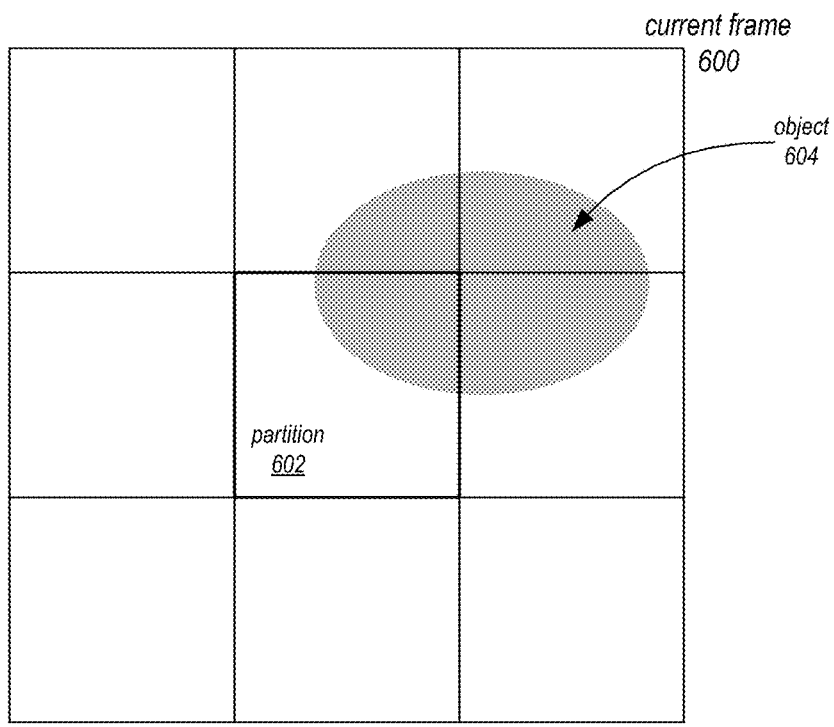
FIGS. 6A and 6B graphically illustrate an example best match partition and motion vector for a partition of a current frame with respect to a reference frame.
Figure 6B:
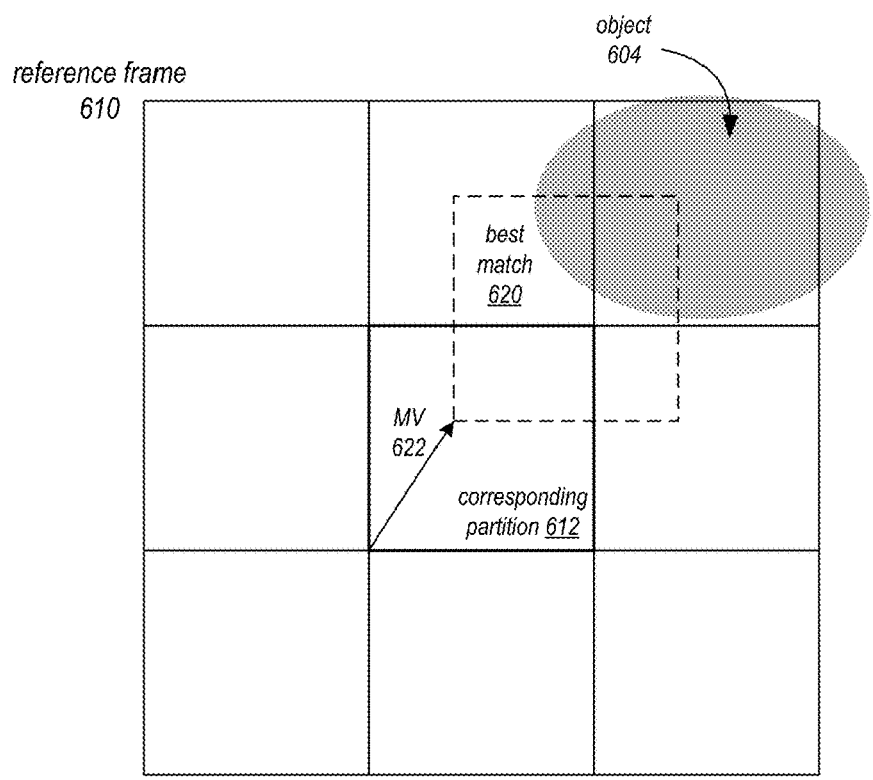

Various embodiments of methods and apparatus for performing motion estimation in block processing pipelines are described. In at least some video encoders, blocks of pixels from a current video frame may be encoded at least in part using blocks of pixels from one or more previously encoded frames (referred to as reference frames). The process of finding best matching pixel blocks in reference frames may be referred to as inter-frame estimation, or more generally as motion estimation. In at least some video encoders, a motion estimation module of a block processing pipeline may determine best motion vectors that indicate the best matching pixel blocks to be passed to subsequent stages of the pipeline for performing motion compensation and reconstruction. FIGS. 6A and 6B graphically illustrate an example best match and motion vector for a current frame with respect to a reference frame.

Figure 5:
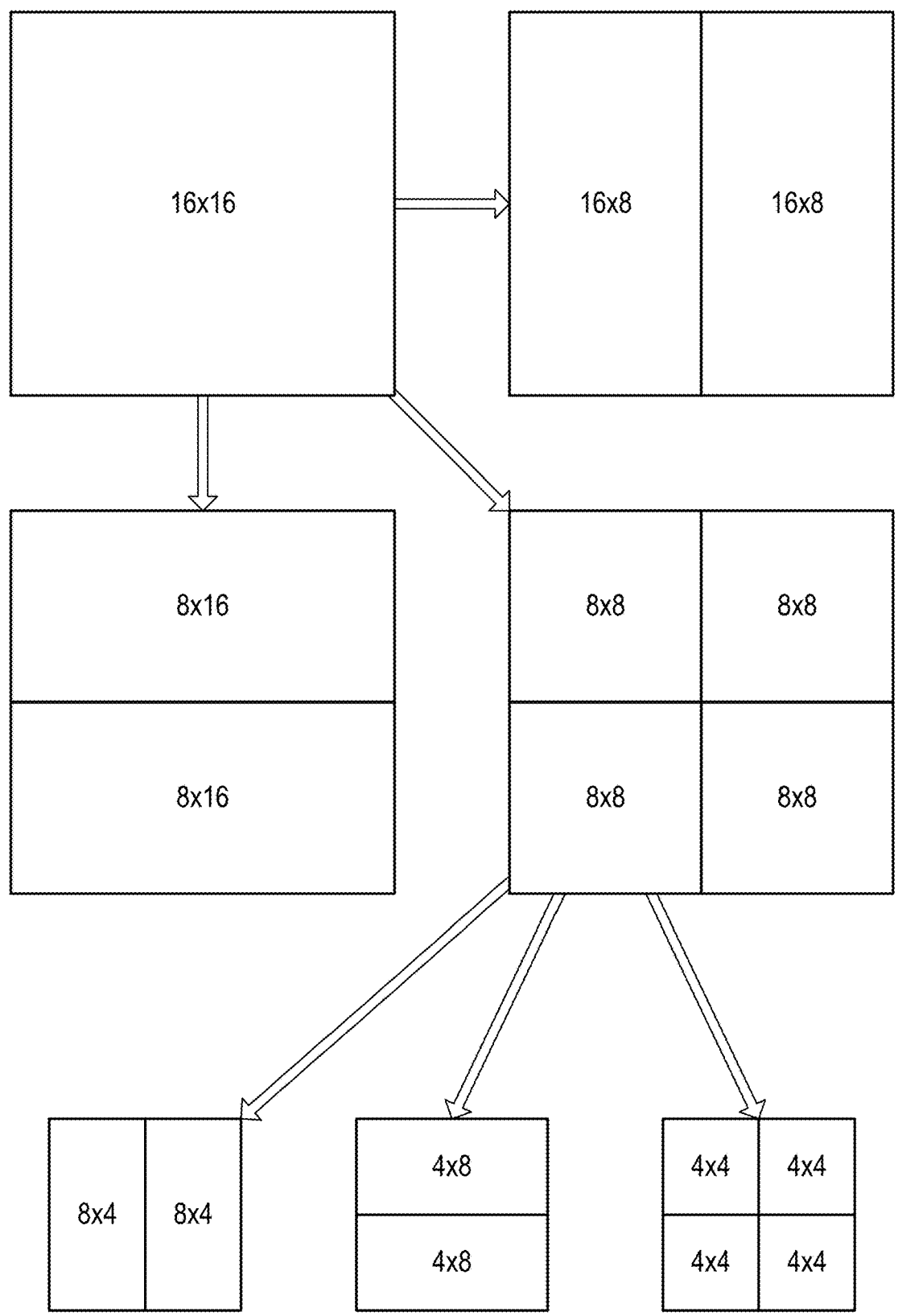
FIG. 5 graphically illustrates example partitions for the H.264 video encoding standard.

In many video encoding standards such as H.264 and H.265, various partition sizes (4×4, 8×4, 4×8, 8×8, 16×8, 8×16, 16×16, etc.) are allowed for motion compensation. FIG. 5 illustrates example partitions for H.264. In at least some embodiments, a motion estimation module may determine suitable motion vectors for each partition size. In at least some embodiments, the motion estimation module may be subdivided into multiple stages. For example, the motion estimation module may implement a hierarchical search algorithm, with each stage searching for motion vectors at a different, progressively finer resolution (e.g., low, full pixel, and subpixel resolutions). Each stage of the motion estimation module determines best matches and candidate motion vectors for one or more partition sizes; the motion vectors may then be refined in the next stage.

In conventional motion estimation modules, motion vectors determined for a particular partition size at one stage are used as seeds for searches at the same partition size in a next stage. In embodiments of a motion estimation module as described herein, the motion vectors that are determined at particular partition sizes at one stage of the module and passed to a next stage of the motion estimation module for refinement may be used as candidates or seeds for multiple partition sizes at the next stage. As an example, in the H.264 video coding standard, motion vector(s) estimated for 8×8 partitions at a stage (e.g., a full pixel stage) may be used as candidates for 8×8 partitions in the next stage (e.g., a subpixel stage), and may also be used as candidates for 16×8, 8×16, and/or 16×16 partitions in the stage.

In some embodiments of a motion estimation module, the best motion vector for each partition size at a stage may be specified as the best motion vector for a larger or the largest partition, which may then be refined in the next stage. As an example, in the H.264 video coding standard, a first stage of a motion estimation module may find the best motion vectors for the 4×4, 4×8, 8×4, etc. partitions, and in a second stage, the best motion vectors at the various partition sizes may all be converted into candidates for 16×16 partitions. In at least some embodiments, the 16×16 candidate motion vectors may be used as seeds or candidates for searches at one or more, or all, of the H.264 partition sizes to generate a set of refined motion vectors at the partition size(s).

Figure 3:
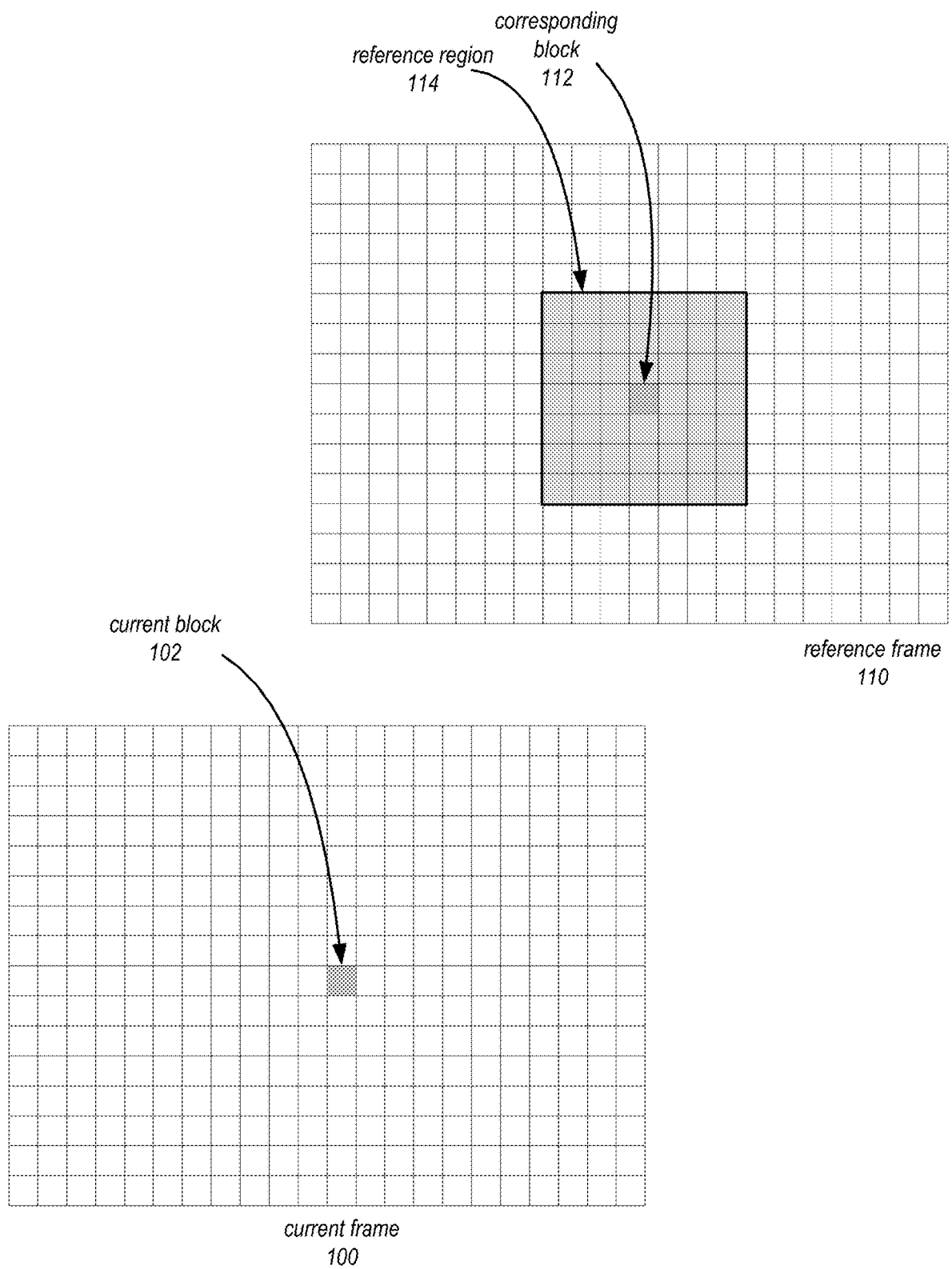
FIG. 3 graphically illustrates an example search region in a reference frame, according to at least some embodiments.

FIG. 3 graphically illustrates an example search region in a reference frame, according to at least some embodiments. Current frame 100 is being processed in a block processing pipeline. Current block 102 represents a block from frame 100 that is at a stage of the pipeline that uses reference data from a reference frame 110. Reference frame 110 represents a frame that was previously processed by the pipeline and output to an external memory. Corresponding block 112 in the reference frame 110 represents a block at a location that corresponds to the location of current block 102 in current frame 100. Reference region 114 represents a region of pixels in reference frame 110 around corresponding block 112 that is to be used as reference data for current block 102. In this example, reference region 114 is a 7×7 block region. In at least some embodiments, the reference region 114 may be fetched from an external memory that stores the reference frame 110 and stored in a memory local to the pipeline for access by one or more stages. Note that the size and shape of the reference region 114 is provided as an example, and is not intended to be limiting. The reference region 114 may be square as shown in FIG. 3, or may be rectangular, substantially circular, or of other shapes. Also note that, in some implementations of a block processing pipeline, a current frame 100 may be processed using reference data from two or more reference frames 110.

Figure 4A:
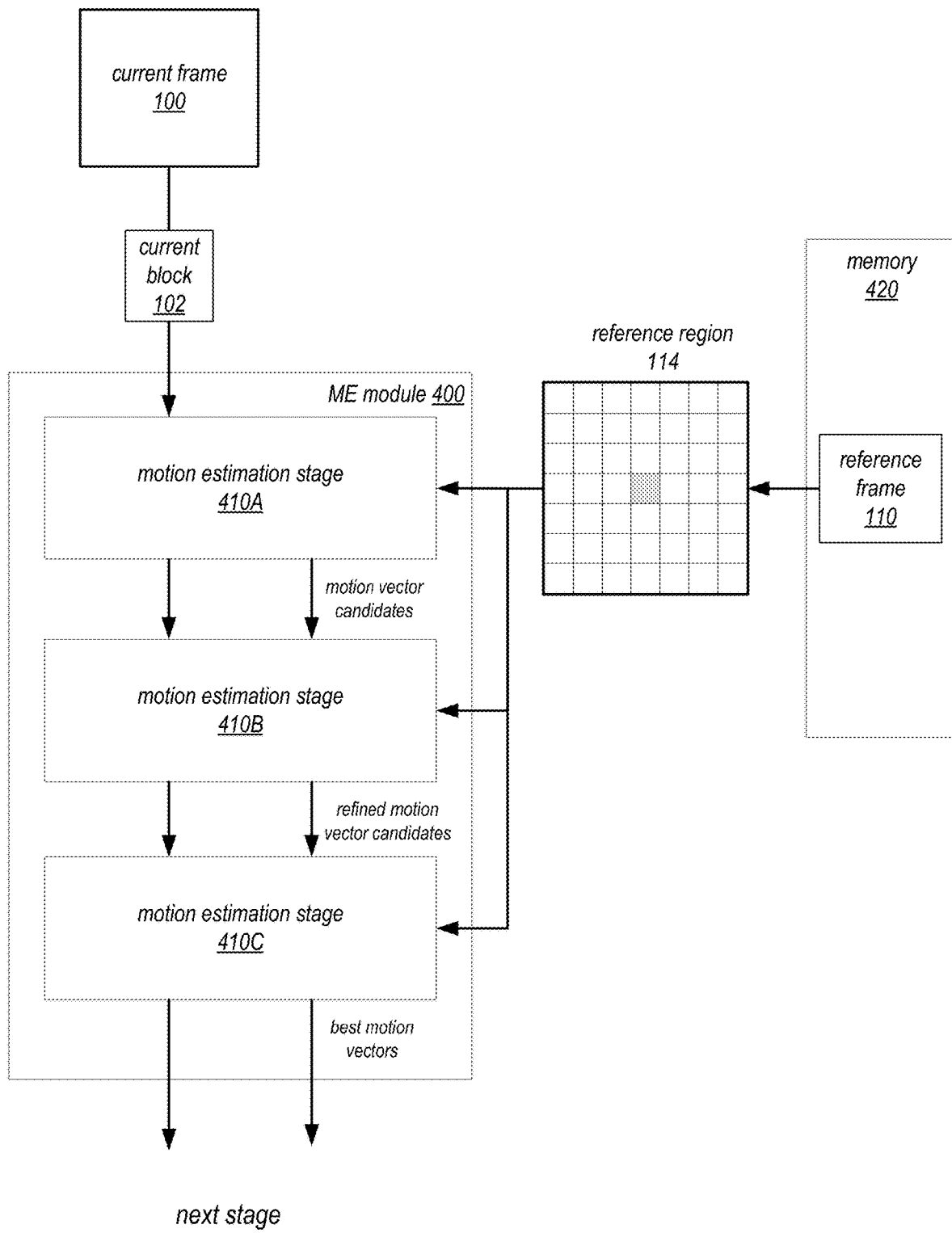
FIGS. 4A and 4B illustrate example motion estimation modules that may implement embodiments of motion estimation methods in block processing pipelines.
Figure 4B:
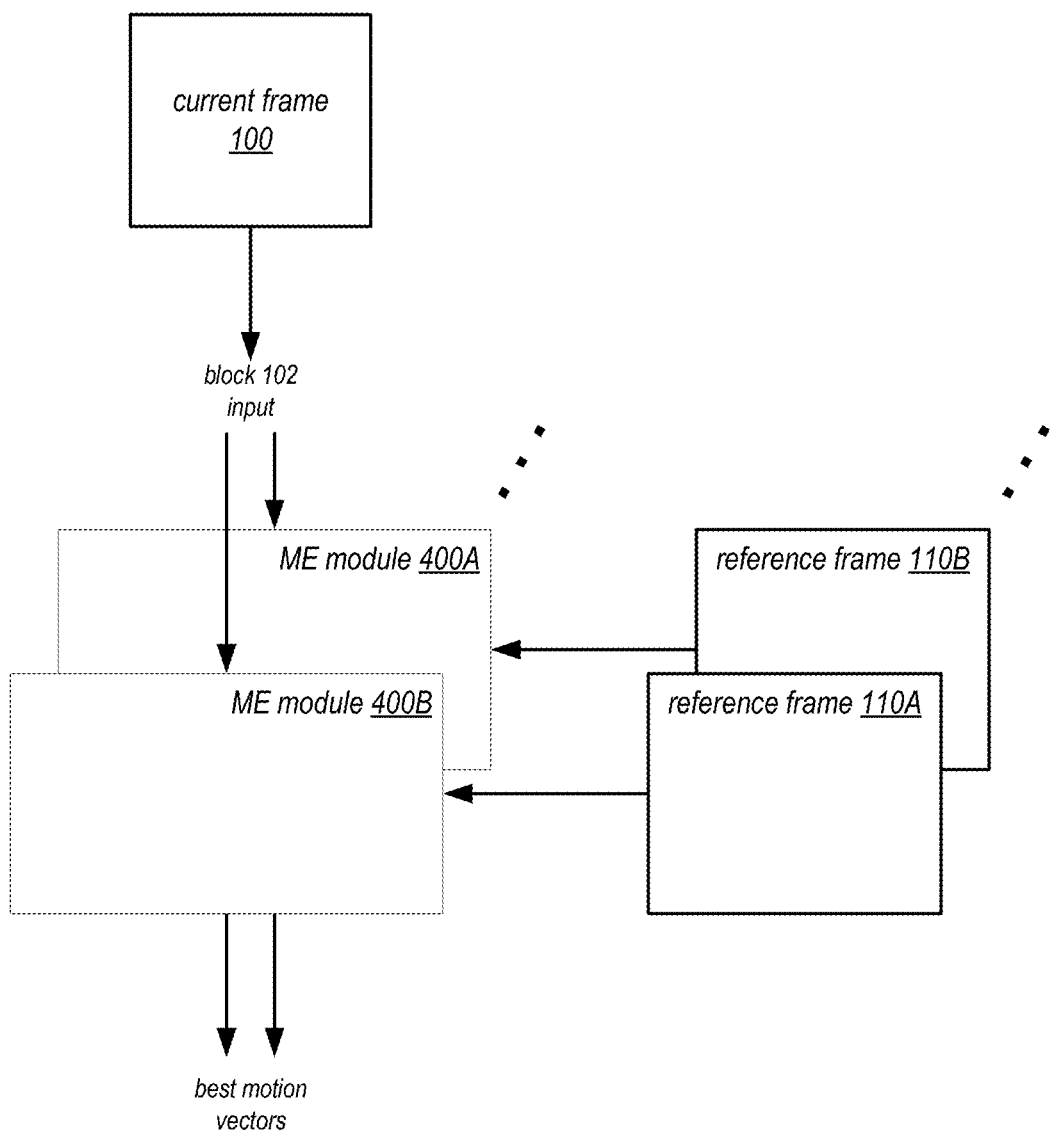

FIGS. 4A and 4B illustrate example motion estimation modules that may implement embodiments of the motion estimation methods as described herein in block processing pipelines, and are not intended to be limiting. The motion estimation modules may be used in hardware or software block processing pipeline implementations. The motion estimation modules may be used in block processing pipelines in which, instead of processing blocks in scan order, blocks are input to the pipeline(s) according to groups of rows, for example using a knight's order processing method to a block processing pipeline as described in the section titled Knight's order processing, or alternatively using parallel pipelines. In these block processing pipeline implementations, block input method(s) for the pipeline(s) input blocks in groups of r rows, beginning at a top row and with each subsequent block input from a next row, returning to the top row after inputting a block from the bottom row.

FIG. 4A illustrates an example motion estimation (ME) module 400 with multiple stages 410A-410C, according to at least some embodiments. While FIG. 4A shows three stages 410A-410C as an example, an ME module 400 may include fewer or more stages 410. As a current block 102 from a current frame 100 being processed passes through the stages 410A-410C, each stage 410 of ME module 400 in turn accesses reference region 114 from a previously processed reference frame 110 to determine candidate motion vectors for the block 102, and passes the motion vectors to a next stage of the pipeline for further processing. In at least some embodiments, reference region 114 may be prefetched from memory 420 into a local memory (also referred to as a search window) for access by the stages 410 of the ME module 400.

In at least some embodiments, ME module 400 may implement a hierarchical search algorithm, and the motion estimation stages 410A-410C may each search for motion vectors at a different, and progressively finer, resolution to refine the motion vectors for final output as a set of best candidate motion vectors for the current block 102 to a next stage of the pipeline, for example a mode decision stage as described later in this document. For example, motion estimation stage 410A may perform an exhaustive, low-resolution search to determine a set of candidate motion vectors. In at least some embodiments, to perform the low resolution search at stage 410A, the current block 102 and reference region 114 may be downsized or scaled down, for example by a factor of 16 (¼ vertical, ¼ horizontal). Motion estimation stage 410B may perform searches at full pixel (full-pel) resolution using the candidate motion vectors as seeds to refine the motion vectors received from stage 410A, and motion estimation stage 410C may perform searches at subpixel (sub-pel) resolution (e.g., ½ and ¼ pixel resolution) using refined motion vectors received from stage 410B as seeds to determine a set of best motion vectors for output to a next stage of the pipeline (e.g., a mode decision stage).

ME module 400 may concurrently process different blocks input from current frame 100 at each stage 410, for example blocks input according to a knight's order processing method as described later in this document. For example, blocks i, i+1, and i+2 according to an input order may be concurrently processed at stages 410C through 410A, respectively, with a block i+3 being the next block input to stage 410A.

In at least some embodiments, each block i, i+1, i+2 . . . from an input frame 100 may be processed by the stages 410 of ME module 400 according to reference data that has been prefetched from memory 420 into a search window. In these embodiments, pixel data from a reference frame 110 in memory 420 is prefetched into a local memory (e.g., SRAM (static random access memory)), referred to as a search window, for access by multiple stages of the pipeline. Stages 410A-410C may each process a block from the input frame 100 currently at the respective stage 410 according to a corresponding region 114 of pixels from the reference frame 110 that is currently stored in the search window memory. The search window may store multiple rows and columns of blocks of pixels from the reference frame 110, and may be appropriately sized so that the width and height of the search window is sufficient to at least encompass two or more overlapping regions 114 of pixels from the reference frame 110 corresponding to two or more blocks 102, each block from a different row and column in the input frame 100, that are currently being processed in the pipeline. Thus, multiple stages of the pipeline may process blocks 102 from multiple rows of an input frame 100 using one set of overlapping pixel data from a reference frame 110 that is stored in a shared search window memory.

In at least some block processing pipeline implementations, each block 102 may be processed using reference data 112 from two or more reference frames 110, and the block processing pipeline may include one instance of a motion estimation module 400 for each reference frame 100 to be searched. FIG. 4B illustrates an example block processing pipeline that includes at least two motion estimation (ME) modules 400A and 400B that each implement two or more stages of a motion estimation method, for example stages 410A, 410B, and 410C as shown in FIG. 4A. Each ME module 400 performs operations on each block 102 input from a current frame 100 according to a respective reference frame 110. In this example, the two ME modules 400A and 400B process blocks 102 input from current frame 100 according to reference data from reference frames 110A and 110B, respectively. Each block 102 is input to each ME module 400. In some embodiments, the pipeline may implement a separate search window for each ME module 400. In this example, reference data from reference frame 110A may be prefetched into a search window corresponding to ME module 400A, and reference data from reference frame 110B may be prefetched into a search window corresponding to ME module 400B.

FIG. 5 illustrates example partitions for the H.264 video encoding standard. In video encoding standards such as H.264 and H.265, various partition sizes (4×4, 8×4, 4×8, 8×8, 16×8, 8×16, 16×16, etc.) are allowed for motion compensation. In H.264, for example, 16×16 pixel blocks referred to as macroblocks are used. A 16×16 macroblock may be processed as a 16×16 partition. In addition, a 16×16 macroblock may be partitioned into two 16×8, two 8×16, or four 8×8 partitions for processing. Further, each 8×8 partition may be partitioned into two 8×4, two 4×8, or four 4×4 partitions for processing. H.265 video encoding uses blocks referred to as Coding Tree Units (CTUs) that may vary within the range of 16×16 pixel to 64×64 pixel. The CTUs may be similarly partitioned for processing. For example, a 64×64 CTU may be processed as a 64×64 partition, two 64×32 partitions, two 32×64 partitions, and four 32×32 partitions. Each 32×32 partition can be further partitioned for processing, and so on.

FIGS. 6A and 6B graphically illustrate a motion estimation method that finds a best match and motion vector for a partition of a current frame with respect to a reference frame. FIG. 6A illustrates an area of a current frame 600 that includes a partition 602 of a current block being processed by the motion estimation module. The partition 602 may represent any of the various partition sizes discussed above. For example, in H.264, partition 602 may be a 4×4, 8×4, 4×8, 8×8, 16×8, 8×16, or 16×16 partition. An object 604 that appears in the current frame 600 is shown in relation to partition 602. FIG. 6B illustrates a corresponding area of a reference frame 610 that includes a partition 612 that (spatially) corresponds to partition 602 of the current frame 600. The object 604 that appears in the current frame 600 also appears in the reference frame 610, but not in the exact location as in current frame 600.

A stage of the motion estimation module may perform a search for a best match for partition 602 in a reference region from reference frame 610 that includes corresponding partition 612. The stage may use a block matching algorithm to search for a best matching partition in the reference region for the partition 602 in the current frame 600. Any of various block matching algorithms or variations thereof may be used. If the search succeeds, the best matching partition may be encoded as a motion vector that points to the position of the best match 620 partition in the reference frame 610 relative to partition 602. In FIG. 6B, a best match 620 has been found, and encoded as a motion vector (MV) 622. Note that best match 620 from reference frame 610 includes a similar portion of object 604 as does partition 602 in current frame 600. Note that the search at a stage may be seeded by input from a previous stage, for example by motion vector candidates from a previous stage of the motion estimation module.

While a best match 620 from reference frame 610 is generally similar to partition 602 from the current frame 600, the two may typically not be identical. In at least some embodiments, in addition to encoding a motion vector for the best match 620, the motion estimation module stage may compute a prediction error or distortion metric for the best match 620. The distortion metric may, for example, be passed to a subsequent stage of the pipeline with the respective motion vector, for example to a next stage of the motion estimation module or to a mode decision stage as described later in this document.

In at least some embodiments, the distortion metric may be calculated as the difference between partition 602 from current frame and its best match 620. Any of various algorithms may be used to calculate the distortion metric at a stage in various embodiments. For example, a Sum of Absolute Differences (SAD) algorithm or a Sum of Absolute Transformed Differences (SATD) algorithm may be used in embodiments. In some embodiments, different stages of the motion estimation module may use different algorithms to calculate the distortion metric. For example, one stage may use SAD to compute the distortion metric, and a next stage may use SATD to compute the distortion metric.

In at least some embodiments of motion estimation modules 400 as illustrated in FIGS. 4A and 4B, the motion vectors that are determined at a particular partition size at one stage 410 of the module 400 and passed to a next stage 410 of the module 400 for refinement may be used as candidates or seeds for multiple partition sizes at the next stage 410. As a non-limiting example, motion vector(s) estimated for 8×8 partitions at a full pixel resolution stage 410B may be used as candidates for 8×8 partitions at a subpixel resolution stage 410C, and may also be used as candidates for 16×8, 8×16, and/or 16×16 partitions at the subpixel stage 410C.

Figure 7:
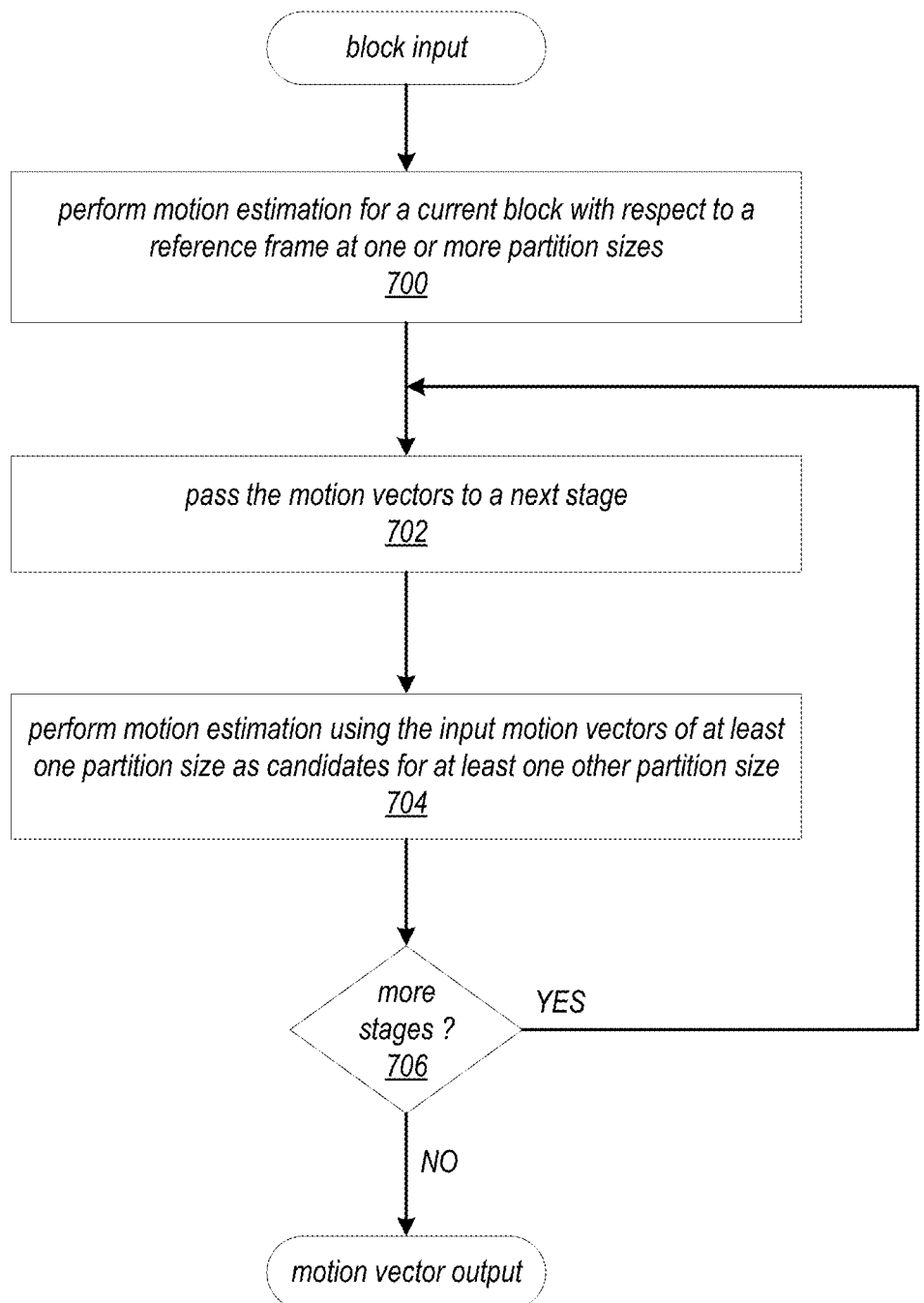
FIG. 7 is a high-level flowchart of a method for performing motion estimation using motion vectors for one partition size as candidates for another partition size, according to at least some embodiments.

FIG. 7 is a high-level flowchart of a method for performing motion estimation using motion vectors determined for one partition size as candidates for another partition size, according to at least some embodiments. Blocks may be input to a motion estimation module from a current frame being processed by a block processing pipeline. An example block processing method and pipeline is shown in FIG. 18. The motion estimation module may include two or more stages, as shown in FIG. 4A. For example, the motion estimation module may implement a hierarchical search algorithm, with each stage searching for motion vectors at a different, progressively finer resolution (e.g., low, full pixel, and subpixel resolutions). As indicated at 700 of FIG. 7, motion estimation is performed at a first stage of the motion estimation module for a current block with respect to a reference frame at one or more partition sizes to determine candidate motion vectors. As indicated at 702, the candidate motion vectors may be passed to a next stage for refinement. As indicated at 704, motion estimation may then be performed at the next stage. In performing motion estimation at this stage, input motion vectors of at least one partition size received from the previous stage may be used as candidate motion vectors, also referred to as seeds, in searches for matches for at least one other partition size. For example, motion vectors determined for 8×8 partitions may be used as candidates for 8×8, 16×8, 8×16, and/or 16×16 partitions. As another example, motion vectors determined for 4×4 partitions may be used as candidates for one or more larger partition sizes, including but not limited to 8×4, 4×8, and 8×8 partitions. Note that, while upsizing motion vectors from a smaller partition size (e.g., 8×8) to search for a larger partition size (e.g., 16×16) is generally described herein, in some embodiments a motion vector from a larger partition size (e.g., 16×16) may be downsized and used to search for a smaller partition size (e.g., 8×8).

At 706 of FIG. 7, if there are more stages in the motion estimation module, then the method may return to element 702 where the motion vectors refined at this stage may be passed to the next stage for further refinement. At 706, if there are no more stages in the motion estimation module, then the refined motion vectors may be based to a next stage of the block processing pipeline, for example to a mode decision stage as described later in this document.

While not shown in FIG. 7, in at least some embodiments, a distortion metric may also be calculated for each motion vector determined at a stage of the motion estimation module, and the distortion metrics may be passed to the next stage of the pipeline with the respective motion vectors. In some embodiments, the distortion metrics may, for example, be used at a motion estimation stage in making motion estimation decisions, for example decisions about which of the candidate motion vectors input from the previous stage are to be used in searches, and at which partition sizes the motion vectors are to be used as seeds.

Figure 8A:
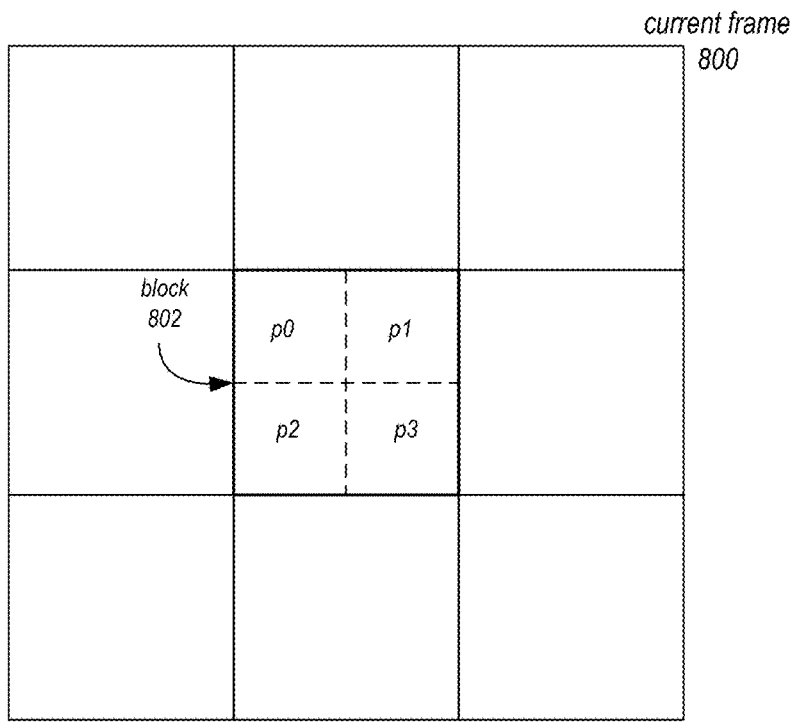
FIGS. 8A through 8C graphically illustrate using motion vectors for one partition size as candidates for one or more other partition sizes, according to at least some embodiments.
Figure 8B:
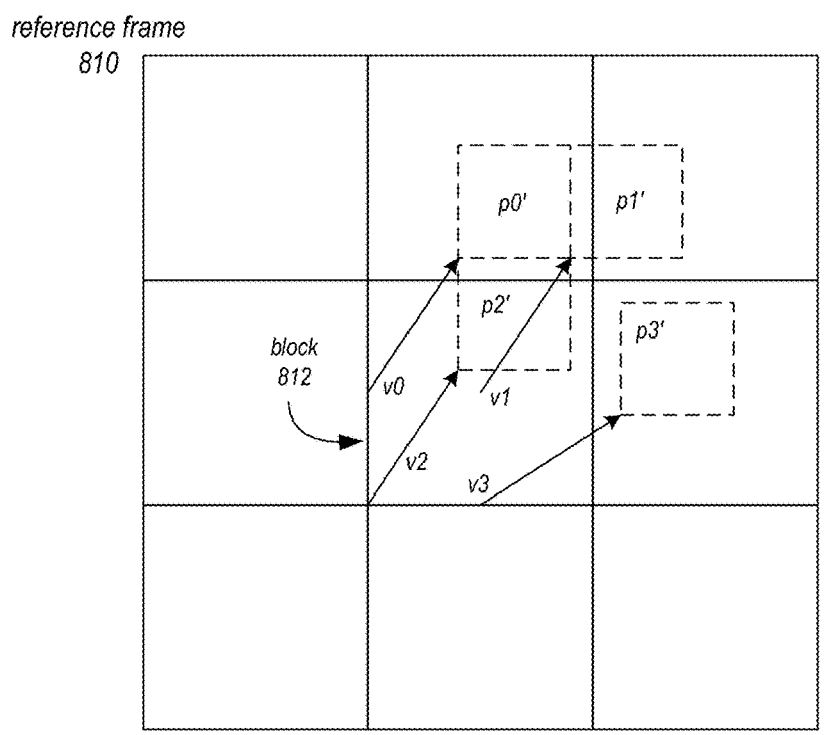
Figure 8C:
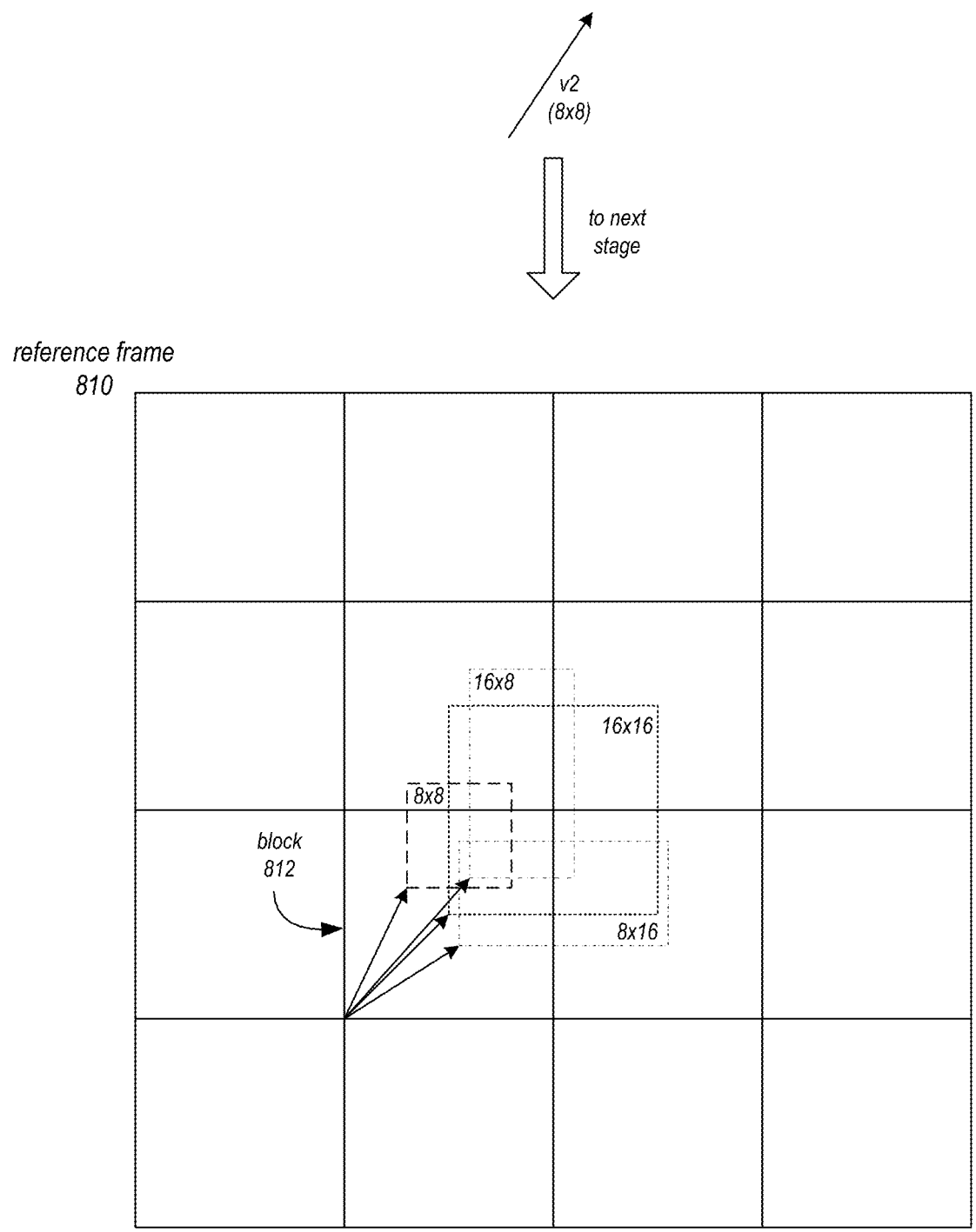

The elements of FIG. 7 are further illustrated and described in reference to FIGS. 8A through 8C.

FIGS. 8A through 8C graphically illustrate using motion vectors determined for one partition size as candidates for one or more other partition sizes, according to at least some embodiments. FIG. 8A illustrates an area of a current frame 800 that includes a current block 802 being processed by a motion estimation module. FIG. 8B illustrates a corresponding area of a reference frame 810 that includes a block 812 that (spatially) corresponds to block 802 of the current frame 800. At a stage of the motion estimation module, for example at a full pixel resolution stage 410B, the block 802 may be subdivided into partitions. FIG. 8A shows block 802 subdivided into four partitions p0-p3. For example, in H.264, block 802 may be a 16×16 macroblock, and partitions p0-p3 may be 8×8 partitions. The stage may perform a search for a best match for each partition p0-p3 of block 802 from current frame 800 in a reference region from reference frame 810 that includes corresponding block 812. As shown in FIG. 8B, best matches p0'-p3' for partitions p0-p3 may be found by the search, and the best matches p0'-p3' may be encoded as motion vectors v0-v3, respectively, each motion vector v pointing to the position of a respective best match p' in the reference frame 810 relative to a respective partition p of block 802 in current frame 800. As shown by best matches p0'-p2' and motion vectors v0-v2 in FIG. 8B, the motion vectors for a set of partitions from a block 802 may be generally similar in direction and amplitude. However, as shown by best match p3' and motion vector v2 in FIG. 8B, one or more of the motion vectors may be significantly different in direction and/or amplitude.

Motion vectors v0-v3 may be passed to a next stage of the motion estimation module, for example to a subpixel resolution stage 410C. In at least some embodiments, a distortion metric may also be calculated for each of p0'-p3'; the distortion metrics may also be passed to the next stage.

FIG. 8C illustrates using motion vectors determined for one partition size at one stage of a motion estimation module as candidates for searching for matches in reference frame 810 at other partition sizes at another stage of the motion estimation module, according to at least some embodiments. FIG. 8C shows an example motion vector v2 that was determined for a particular partition size (8×8, in this example) by a stage of the motion estimation module (e.g., a full pixel stage 410B) as shown in FIG. 8B. The motion vector v2 is passed to a next stage of the motion estimation module (e.g., a subpixel stage 410C) as a candidate motion vector and as a seed for searching at the next stage. However, instead of only using motion vector v2 as a seed for searches at the same partition size (8×8, in this example), motion vector v2 may be used as a seed for searching at two or more partition sizes. For example, as shown in FIG. 8C, a motion vector v2 that was determined for an 8×8 partition may be used as a candidates for 8×8 partitions in the next stage, and may also be used as candidates for 16×8, 8×16, and/or 16×16 partitions in the stage. While not shown in FIG. 8C, one or more of the other motion vectors (v0, v1, v3) determined at the previous stage as shown in FIG. 8B may also be used as candidates for other partition sizes at the next stage.

Figure 9:
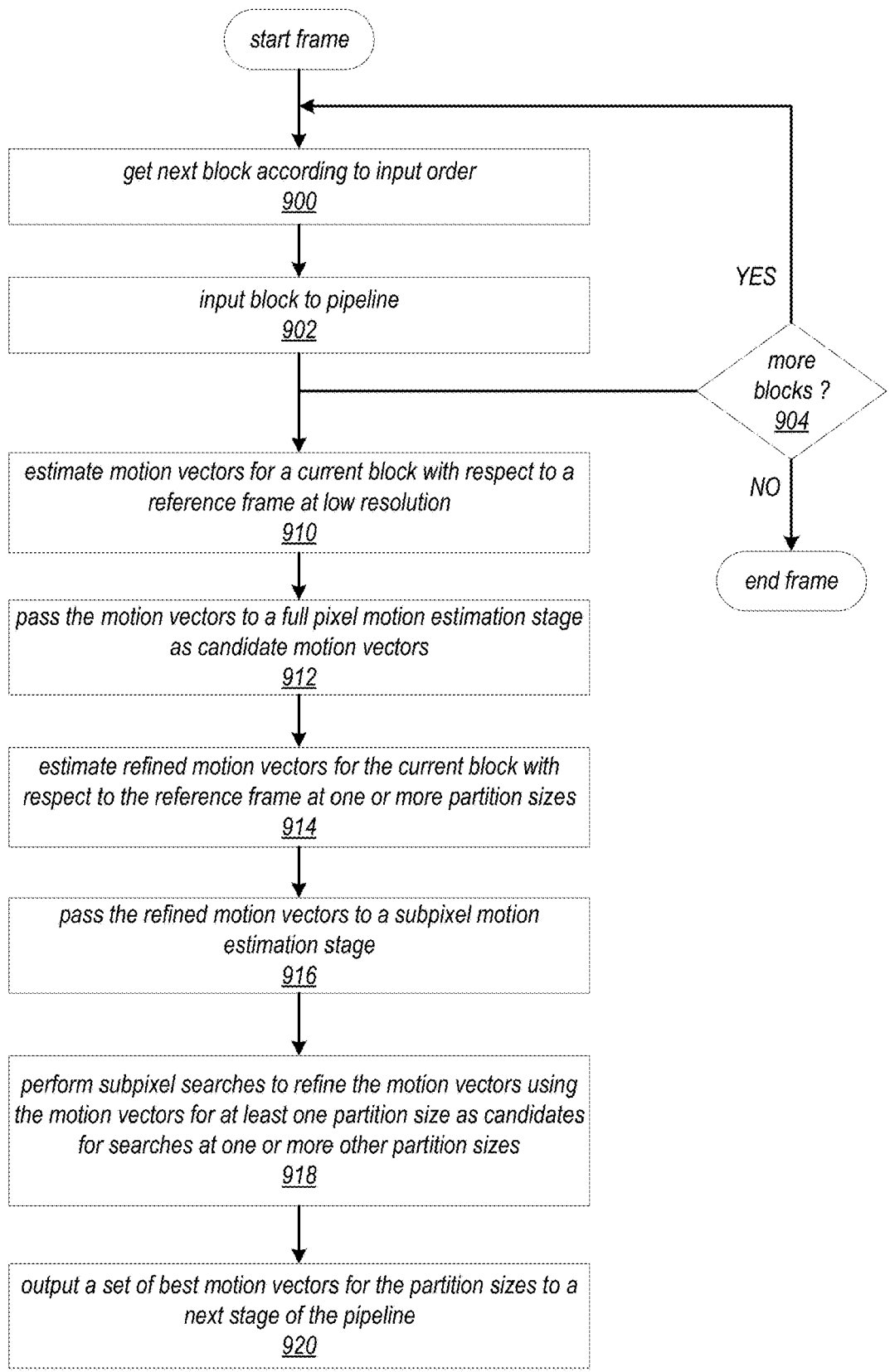
FIG. 9 is a flowchart of an example hierarchical method for performing motion estimation in a block processing pipeline, according to at least some embodiments.

FIG. 9 is a flowchart of an example hierarchical method for performing motion estimation for the blocks of an input frame in a block processing pipeline, according to at least some embodiments. In at least some embodiments, a motion estimation module may implement a hierarchical search algorithm, and the motion estimation stages may each search for motion vectors at a different, and progressively finer, resolution to refine the motion vectors for final output as a set of best candidate motion vectors for a current block to a next stage of the pipeline, for example to a mode decision stage as described later in this document. For example, referring to ME module 400 in FIG. 4A, motion estimation stage 410A may perform a low-resolution search to determine a set of candidate motion vectors, motion estimation stage 410B may perform searches at full pixel (full-pel) resolution using the candidate motion vectors from stage 410A as seeds, and motion estimation stage 410C may perform searches at subpixel (sub-pel) resolution using the refined motion vectors received from stage 410B as seeds to determine a set of best motion vectors for output to a next stage of the pipeline (e.g., a mode decision stage).

In FIG. 9, as indicated at 900, a next block is determined according to an algorithm for determining a next input block. For example, the next block may be determined according to a knight's order processing method as described elsewhere in this document. As indicated at 902, the block is input to the pipeline, for example from a memory via direct memory access (DMA). As shown by 904, the input process of elements 900 and 902 continues as long as there are blocks to be processed. Each block that is input to the pipeline by elements 900 and 902 is initially input to a first stage of the pipeline, processed, output to a second stage, processed, and so on. When a block moves from a stage to a next stage of the pipeline, the stage can begin processing the next block in the pipeline. Thus, the input blocks move through the stages of the pipeline, with each stage processing one block at a time.

Elements 910 through 922 illustrate an example hierarchical method for performing motion estimation for the input blocks in the block processing pipeline, according to at least some embodiments. Elements 910 through 922 may be implemented by or in a motion estimation module of the pipeline. In at least some embodiments, the pipeline may include two or more motion estimation modules that each implement elements 910 through 922 to separately perform motion estimation for the input blocks with regard to two or more different reference frames as illustrated in FIG. 4B. Note that the motion estimation methods and modules may be implemented as hardware, software, or a combination thereof.

As indicated at 910 of FIG. 9, a first stage of the motion estimation module may estimate motion vectors for a current block with respect to a reference frame at low resolution. For example, referring to FIG. 4A, motion estimation stage 410A may perform an exhaustive, low-resolution search to determine a set of candidate motion vectors. In at least some embodiments, to perform the low resolution search, the current block and the reference region from the reference frame may be downsized or scaled down, for example by a factor of 16 (¼ vertical, ¼ horizontal). As indicated at 912 of FIG. 9, the motion vectors may be passed to a full pixel motion estimation stage as candidate motion vectors.

As indicated at 914 of FIG. 9, a next stage of the motion estimation module may estimate refined motion vectors for the current block with respect to the reference frame at one or more partition sizes based on the motion vectors received from the first stage. For example, referring to FIG. 4A, motion estimation stage 410B may perform searches at full pixel (full-pel) resolution using the motion vectors as seeds to refine the motion vectors received from stage 410A. In some embodiments, for example, the full-pixel stage may perform searches at the 8×8 partition size to generate a set of best 8×8 matches, and then encode the best matches as motion vectors that point to the position of the best 8×8 matches in the reference frame relative to the current block. As indicated at 916 of FIG. 9, the motion vectors may be passed to a next stage of the motion estimation module, for example a subpixel motion estimation stage.

As indicated at 918, subpixel searches may be performed to refine the motion vectors. For example, referring to FIG. 4A, a motion estimation stage 410C may perform searches at subpixel (sub-pel) resolution (e.g., ½ and ¼ pixel resolution) using motion vectors received from stage 410B as seeds to determine a set of best motion vectors for output to a next stage of the pipeline (e.g., a mode decision stage). The motion vectors for at least one partition size may be used as seeds for the subpixel searches for one or more other partition sizes. For example, motion vectors determined for 8×8 partitions at the full-pixel stage (stage 410B) may be used as seeds for subpixel searches at the 16×8, 8×16, and/or 16×16 partition sizes.

Note that the motion vectors received from the previous stage may also be used for subpixel searches at their original partition size, e.g. 8×8 motion vectors may be used as seeds for 8×8 subpixel searches. Also note that, in some embodiments, motion vectors may instead or also be downsized and used as seeds for searches at smaller partition sizes.

As indicated at 922 of FIG. 9, a set of best motion vectors for the current block being processed as determined at the subpixel stage of the motion estimation module may be output to at least one downstream stage of the pipeline. For example, the set of best motion vectors may be output to a mode decision stage of the pipeline as illustrated in FIG. 18. In some embodiments, the set of best motion vectors may include at least one motion vector for at least one partition size. In some embodiments, the set of best motion vectors may include at least one motion vector for each partition size. In some embodiments, the set of best motion vectors may include a motion vector for each separate partition at each partition size. For example, in H.264 processing, the subpixel stage of a motion estimation module may output sixteen 4×4, eight 8×4, eight 4×8, four 8×8, two 16×8, two 8×16, and one 16×16 motion vector, for a total of 41 motion vectors, to the mode decision stage, along with other information such as distortion metrics for the motion vectors.

While not shown in FIG. 9, in at least some embodiments, a distortion metric may also be calculated for each motion vector found at a stage of the motion estimation module, and the distortion metrics may be passed to the next stage with the respective motion vectors. In at least some embodiments, the distortion metric for a motion vector may be calculated as the difference between the respective partition from the current frame and its best match as found in the reference region. In some embodiments, a Sum of Absolute Differences (SAD) algorithm or a Sum of Absolute Transformed Differences (SATD) algorithm may be used to calculate the distortion metric at a stage. In some embodiments, different stages of the motion estimation module may use different algorithms to calculate the distortion metric. For example, in some embodiments, the low-resolution and full-pixel stages of a motion estimation module that implements a hierarchical search algorithm may use SAD to compute the distortion metric, and the subpixel stage may use SATD to compute the distortion metric.

Upsizing Best Motion Vectors to a Largest Partition Size

In some embodiments of motion estimation modules 400 as illustrated in FIGS. 4A and 4B, the best motion vector(s) for each partition size as determined at a stage may be specified as best motion vector(s) for a larger or largest partition size. The candidate motion vectors promoted to the larger or largest partition size may then be used to generate refined motion vectors in the next stage for one or more partition sizes. For example, if there are ten motion vector candidates generated from one stage corresponding to various partition sizes, each of the ten motion vector candidates may be upsized to a largest partition size and used to search one or more of the partitions in the next stage. For example, in the H.264 video coding standard, there are 41 partitions in a macroblock (1 16×16, 2 16×8, 2 8×16, 4 8×8, 8 8×4, 8 4×8, 16 4×4), and the ten best motion vector candidates generated at one stage may be upsized to 16×16 and used to search for all 41 partitions in the next stage. As an example, a full pixel stage 410B of a motion estimation module as illustrated in FIG. 4A may find the best motion vectors for the 4×4, 4×8, 8×4, 8×8, etc. partitions. At a next (subpixel) stage 410C, the best motion vectors at the various partition sizes may be promoted to the 16×16 partition size and used as seeds or candidates for searches at one or more, or all, of the H.264 partition sizes to generate a set of refined motion vectors.

Figure 10:
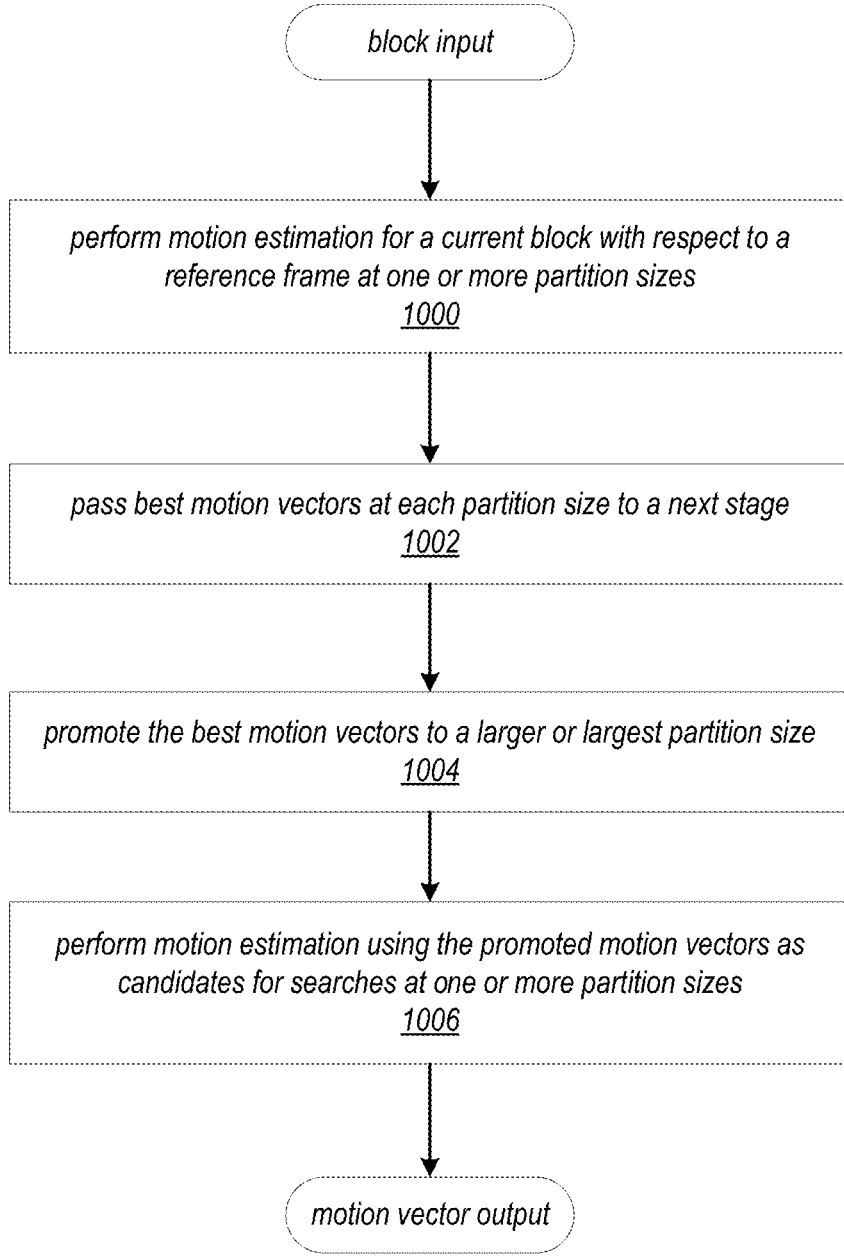
FIG. 10 is a high-level flowchart of a method for performing motion estimation in which best motion vectors for one or more partition sizes are used as candidates for a largest partition size, according to at least some embodiments.

FIG. 10 is a high-level flowchart of a method for performing motion estimation in which best motion vectors for one or more partition sizes are promoted to a larger partition size and used as candidates or seeds for one or more partition sizes, according to at least some embodiments. Blocks may be input to a motion estimation module from a current frame being processed by a block processing pipeline. An example block processing method and pipeline is shown in FIG. 18. The motion estimation module may include two or more stages, as shown in FIG. 4A. For example, the motion estimation module may implement a hierarchical search algorithm, with each stage searching for motion vectors at a different, progressively finer resolution (e.g., low, full pixel, and subpixel resolutions).

As indicated at 1000 of FIG. 10, at a stage of the motion estimation engine, motion estimation is performed for a current block with respect to a reference frame at one or more partition sizes to determine candidate motion vectors. For example, referring to FIG. 4A, a full pixel stage 410B of a motion estimation module 400 may find the best motion vectors for the 4×4, 4×8, 8×4, 8×8, etc. partitions. As indicated at 1002 of FIG. 10, the best motion vectors for one or more of these partition sizes may be passed to a next stage of the motion estimation engine, for example a subpixel stage 410C of the motion estimation module 400 as shown in FIG. 4A. As indicated at 1004 of FIG. 10, the input best motion vectors may be promoted to a larger or largest partition size, for example 16×16 for H.264. As indicated at 1006, the promoted motion vectors may be used as seeds for searches (e.g., subpixel searches) at one or more partition sizes, including but not limited to the largest partition size. Motion estimation may thus be performed by upsizing the best motion vectors generated at one stage to produce candidate motion vectors at a larger or largest partition size (e.g., 16×16), and then using the candidate motion vectors at the larger or largest partition size as seeds to search at some or all of the partition sizes for the current block. The refined motion vectors may then be output to a next stage, for example a mode decision stage as described later in this document.

While not shown in FIG. 10, in at least some embodiments, a distortion metric may also be calculated for each motion vector determined at a stage of the motion estimation module, and the distortion metrics may be passed to the next stage of the pipeline with the respective motion vectors.

Tuning the Motion Estimation Algorithm

In some embodiments of a motion estimation module such as ME module 400 illustrated in FIG. 4, the number of motion vectors determined at each stage 410 and the number of motion vectors passed to a next stage 410 may be fixed. In addition, the partition sizes searched at each stage, and the number of partitions searched at each stage, may be fixed. However, in some embodiments, the motion estimation module may expose one or more tunable parameters so that one or more of the stages 410 may be tuned to determine how many motion vectors to determine at the stage 410, and what partition sizes the motion vectors are to be determined at. Thus, one or more of the stages 410 may be tuned to pass on more or fewer motion vectors, and motion vectors at different partition sizes. In addition, in some embodiments, the partition sizes to be used as seeds for searching at other partition sizes at one or more of the stages 410 may be tunable.

In at least some embodiments, the motion estimation module may expose one or more motion estimation parameters to processes external to the module that allow the motion estimation as performed by one or more of the motion estimation stages 410 to be tuned. Tuning the stages 410 may, for example, be performed in response to input from one or more other stages of the pipeline, for example feedback from a downstream stage, or in response to external programming input to the pipeline. The tuning may be performed, for example to adjust motion estimation based on resolution or other aspects of the vide frame or frames being processed in the pipeline.

Filtering Motion Vectors for Upsizing

In some embodiments of a motion estimation module as described herein, motion vectors determined at one stage of the motion estimation module and passed on as candidates to another stage of the motion estimation module may be evaluated by the next stage before using the motion vectors as candidates for searches at their original or at other partition sizes.

For example, a distortion metric may be calculated for each motion vector determined at a stage of the motion estimation module, and the distortion metrics may be passed to the next stage of the motion estimation module with the respective motion vectors. The next stage may look at these distortion metrics and filter out one or more motion vectors for which the distortion metric is relatively high. For example, if motion vectors for four 8×8 partitions are received, and one of the motion vector's respective distortion metric (e.g., SAD) is relatively high, the stage may use the other three motion vectors as seeds for searches at larger partition sizes, but not use the motion vector with the high distortion metric. In at least some embodiments, a threshold for the distortion metric may be specified, and motion vectors for which the distortion metric exceeds the threshold may not be used as seeds for searches at other partition sizes. In at least some embodiments, this threshold may be a tunable parameter of the motion estimation module.

As another example, if one of a set of motion vectors for a partition size differs significantly in amplitude and/or direction from the other motion vectors in the set (see, e.g., motion vector v3 in FIG. 8B), the aberrant motion vector may not be used as a seed for searches at other partition sizes. In at least some embodiments, thresholds for differences in amplitude and/or direction of motion vectors may be specified, and motion vectors for which one or more of these parameters exceed the thresholds may not be used as seeds for searches at other partition sizes. In at least some embodiments, these thresholds may be tunable parameters of the motion estimation module.

As yet another example, if a motion vector at one partition size is substantially the same as a motion vector at another partition size, then the stage may only use one of the motion vectors as a seed for searching. For example, if an 8×8 motion vector received from the previous stage is substantially the same as a 16×16 motion vector received from the previous stage, then the stage may decide not to use the 8×8 motion vector as a seed to search for a 16×16 match.

Knight's Order Processing

Embodiments of block processing methods and apparatus are described in which, rather than processing blocks in a pipeline according to scan order as in conventional methods, the blocks are input to and processed in the pipeline according to an order referred to herein as "knight's order." Knight's order is in reference to a move of a chess knight piece in which the knight moves one row down and two columns to the left. Note, however, that "knight's order" as used herein more generally encompasses movements of one row down and p columns to the left, where p may be but is not necessarily 2.

Figure 11:
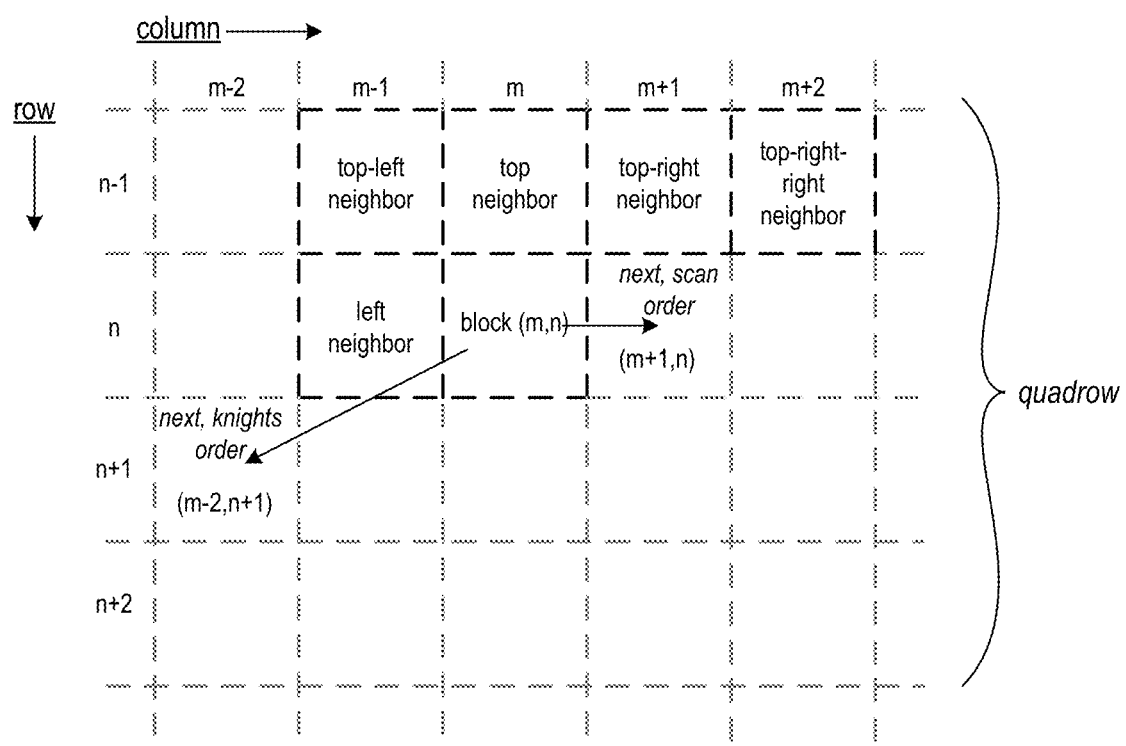
FIG. 11 shows neighbor blocks of a current block in a frame, and further illustrates a knight's order processing method for the blocks, according to at least some embodiments.

The knight's order processing method may provide spacing (one or more stages) between adjacent blocks in the pipeline, which, for example, facilitates feedback of data from a downstream stage of the pipeline processing a first block to an upstream stage of the pipeline processing a second block that depends on the data from the first block. For example, in at least some embodiments, a stage downstream of motion estimation in the pipeline may calculate motion vector predictors, for example the exact motion vector predictor for various partition sizes, and feed the motion vector predictors back to the motion estimation to be used in calculating the rate cost of each motion vector search point. As another example, one or more stages of a block processing pipeline may require information from one or more other neighbor blocks when processing a given block. FIG. 11 shows neighbors of a current block (m,n) from which information may be required—left (m−1,n); top (m,n−1); top-left (m−1,n−1); top-right (m+1,n−1); and top-right-right (m+2,n−1). These requirements for information from neighbor block(s) may be referred to as dependencies. For example, referring to FIG. 11, information from the left neighbor of block (m,n) may be required to perform a particular operation on the block. In the knight's order processing method, rather than inputting block (m+1, n) into the pipeline immediately after block (m,n), the next block input to the pipeline is block (m−2,n+1). Inputting the blocks into the pipeline in knight's order rather than scan order provides spacing (e.g., one or more stages) between adjacent blocks on a row in the pipeline.

In at least some embodiments of the knight's order processing method, the rows of blocks in the input frame may be divided into sets of four rows, referred to herein as quadrows, with the knight's order processing method constrained by the quadrow boundaries. Referring to FIG. 11, when using quadrow boundaries with knight's order processing block (m−1,n) will be four stages downstream when block (m,n) is input to the pipeline, and block (m,n) will be four stages downstream when block (m+1,n) is input to the pipeline. Thus, blocks that are adjacent on a row will be spaced four stages apart in the pipeline. Thus, at stages in which operations are performed on a block that depend on left neighbor information, the information for the left neighbor is more likely to be readily available with less latency than it would be if processing the blocks in scan order. In addition to dependencies on the left neighbor, one or more operations of a block processing method may depend on neighbor blocks from the previous (or above) row such as the top neighbor, top-left neighbor, top-right neighbor, and top-right-right neighbor blocks as shown in FIG. 11. The knight's order processing method with quadrow constraints provides locality of neighbor information that may be leveraged to provide local caching of this neighbor data at each stage in relatively small buffers.

In at least some embodiments, a basic algorithm for determining a next block to input to the pipeline according to the knight's order processing method using quadrow constraints is as follows:

---
If not on the bottom row of a quadrow:
    The next block is two columns left, one row down (−2, +1).
Otherwise, at the bottom row of a quadrow:
    The next block is seven columns right, three rows up (+7,− 3).
---

However, the knight's order processing method may also be implemented with other spacing than two blocks left, one block down (−2,+1). For example, instead of two blocks left and one block down, the method may be implemented to go three blocks left and one block down to get the next block. As another example, the method may be implemented to go one block left and one block down (−1,+1) to get the next block. In addition, the knight's order processing method may be implemented with other row constraints than quadrow (four row) constraints. In other words, row groups of at least two rows may be used in embodiments to constrain the knight's order processing method. Assuming r as the number of rows used to constrain the knight's order processing method, the algorithm may be generalized as:

---
If not on the bottom row of a row group:
    The next block is p columns left, one row down (−p, +1).
Otherwise, at the bottom row of a row group:
    The next block is q columns right, (r−1) rows up (+q, −(r−1)).
---

Changing the value of p would affect the value of q, would not affect spacing between adjacent blocks from a row in the pipeline, but would affect spacing between a given block and its other neighbor blocks (e.g., its top-left, top, and top-right neighbors). In particular, note that using the spacing (−1,+1) would result in a block and its diagonal (top-right) neighbor block being concurrently processed at adjacent stages of the pipeline. Thus, a spacing of at least two blocks left may be used so that diagonally adjacent blocks are not concurrently processed at adjacent stages of the block processing pipeline. Changing the value of r would affect the value of q, would affect spacing between adjacent blocks from a row in the pipeline, and would affect spacing between the block and its other neighbor blocks (e.g., its top-left, top, and top-right neighbors).

The above algorithm for determining a next block may begin at an initial block. Upon reaching the end of a quadrow that is followed by another quadrow, the algorithm jumps to the first block of the next quadrow and then crosses over between the quadrow and the next quadrow for a few cycles, resulting in the interleaving of some blocks from the end of the quadrow with some blocks from the beginning of the next quadrow. In other words, the knight's order processing method treats the quadrows as if they were arranged end to end. To avoid complications in the algorithm and to maintain consistent spacing of blocks in the pipeline, at least some embodiments may pad the beginning of the first quadrow and the end of the last quadrow with invalid blocks. An invalid block may be defined as a block that is outside the boundary of the frame and that is input to the pipeline but that does not contain valid frame data, and thus is not processed at the stages. The algorithm for determining a next block may thus begin at an initial block, which may be either the first block in the top row of the first quadrow or an invalid block to the left of the first block in the top row of the first quadrow, proceed through all of the quadrows, and at the end of the last quadrow continue until the last block of the last quadrow has been input to the pipeline. There will be bubbles in the pipeline at the beginning and end of the frame, but the spacing of the valid blocks from the frame in the pipeline will remain consistent throughout. In some embodiments, as an alternative to padding the end of the last quadrow of a video frame with invalid blocks, the last quadrow of a video frame may be overlapped with the first row of the next video frame to be processed in the block processing pipeline.

Figure 12A:
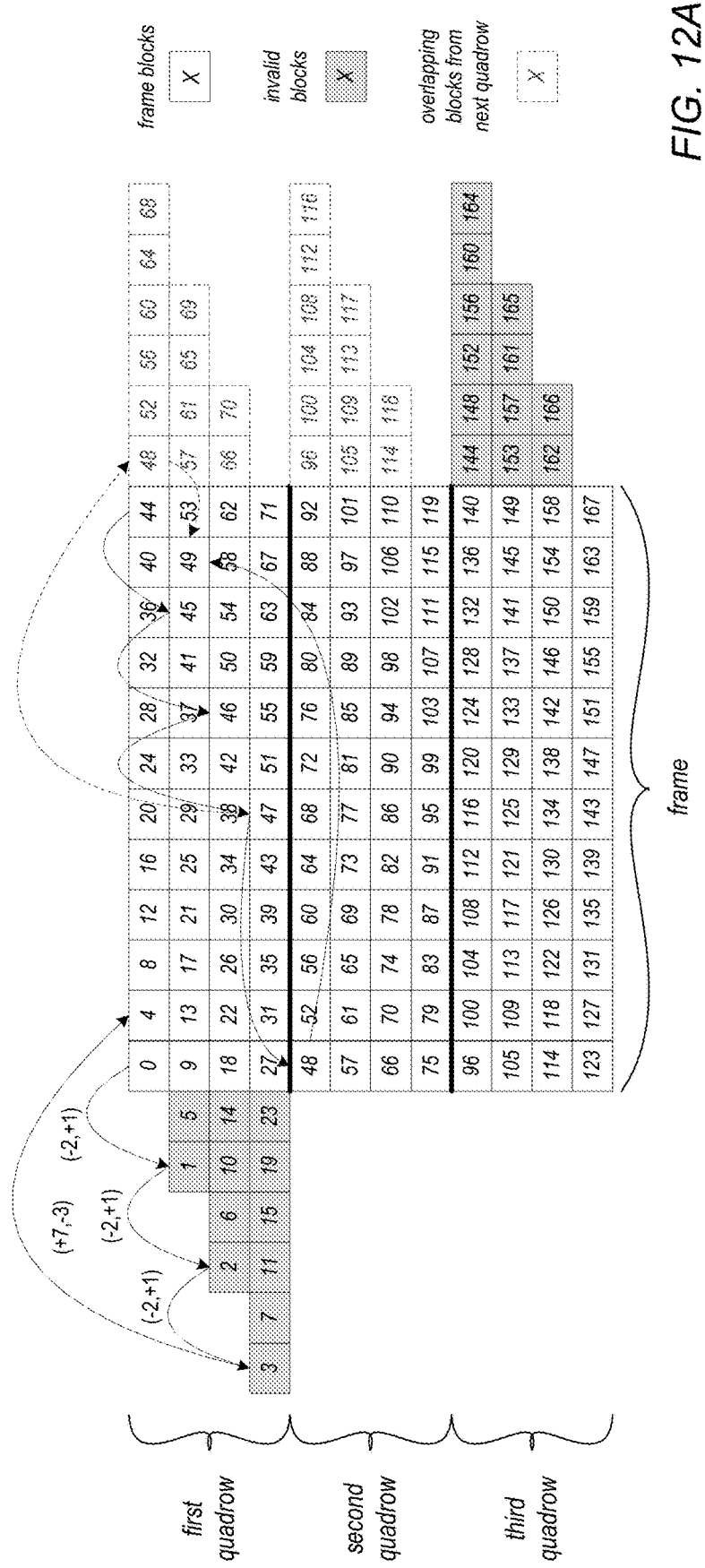
FIGS. 12A and 12B graphically illustrate the knight's order processing method including the algorithm for determining a next block, according to at least some embodiments.
Figure 12B:
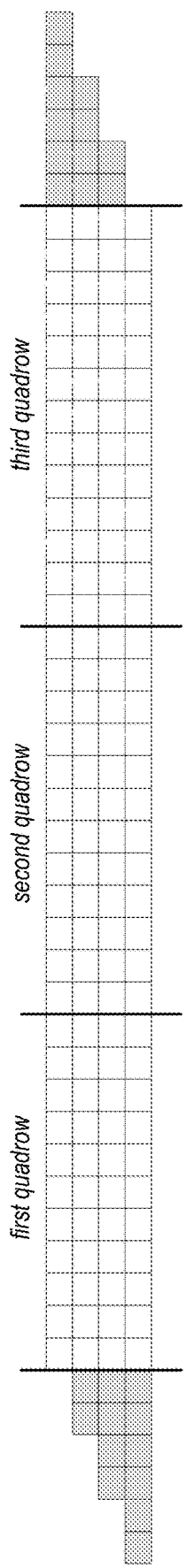

FIGS. 12A and 12B graphically illustrate the knight's order processing method, according to at least some embodiments. For simplicity, these Figures use an example 192× 192 pixel frame divided into 144 16×16 pixel blocks, with 12 rows and 12 columns of blocks. However, it is to be noted that the knight's order processing method can be applied to input video frames of any dimensions. In FIG. 12A, an example frame is divided into rows and columns of blocks. The rows of blocks are partitioned into three quadrows including four rows each. The last three rows of the first quadrow are padded on the left with invalid blocks, and the first three rows of the last (third) quadrow are padded on the right with invalid blocks. In this example, the numbers in the blocks represent the order in which the blocks are input to the block processing pipeline according to the knight's order processing method, beginning with block 0 (the first block in the top row of the first quadrow). Block 0 is input to the first stage of the pipeline, and when the first stage is ready for another block, the method proceeds by going two columns left, one row down to get the next block for input (block 1, in FIG. 12A). This pattern is repeated until reaching the bottom of the quadrow. At the bottom of the quadrow, the method goes seven columns right, three rows up to get the next block. This continues until all of the blocks in the frame (as well as all of the invalid blocks shown in FIG. 12A) are input into the pipeline. When the end of a quadrow is reached, if there is another quadrow after the quadrow the input algorithm proceeds to the beginning of the next quadrow. In this example, after block 47 is input, the method proceeds to block 48 (the first block in the top row of the second quadrow). As shown by the dashed arrow from block 47 to the dashed rectangle labeled 48 to the right of block 44, the first block of the top row of the second quadrow (block 48) is treated as being immediately to the right of the last block of the top row of the first quadrow (block 44), and thus is reached from block 47 by going seven columns right, three columns up. In other words, the knight's order processing method treats the quadrows as if they were arranged end to end, with invalid blocks at each end, as shown in FIG. 12B. Thus, the algorithm for determining a next block remains the same across the entire frame.

In some embodiments, each row of the first quadrow may be padded with extra invalid blocks, for example with two extra invalid blocks. Instead of beginning with the first block in the top row of the first quadrow as shown in FIG. 12A, input to the pipeline may begin with the first invalid block to the left of the first block in top row of the first quadrow.

Figure 13A:
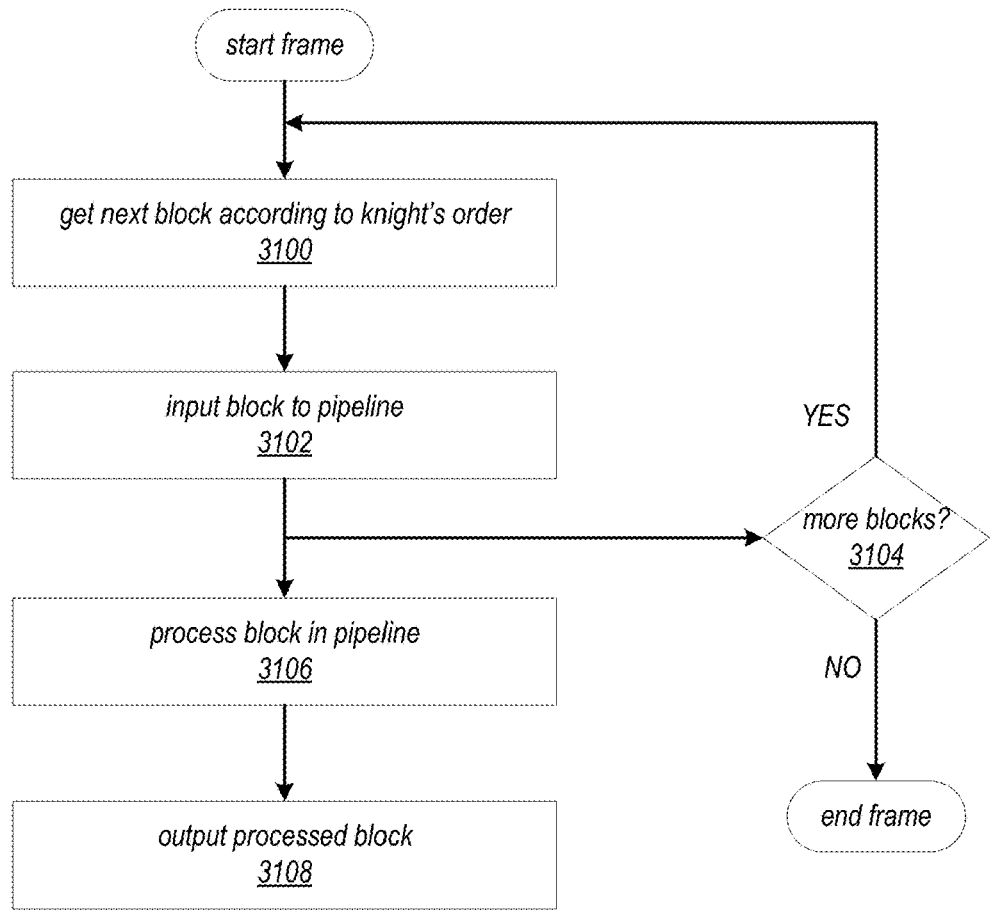
FIGS. 13A and 13B are high-level flowcharts of a knight's order processing method for a block processing pipeline, according to at least some embodiments.
Figure 13B:
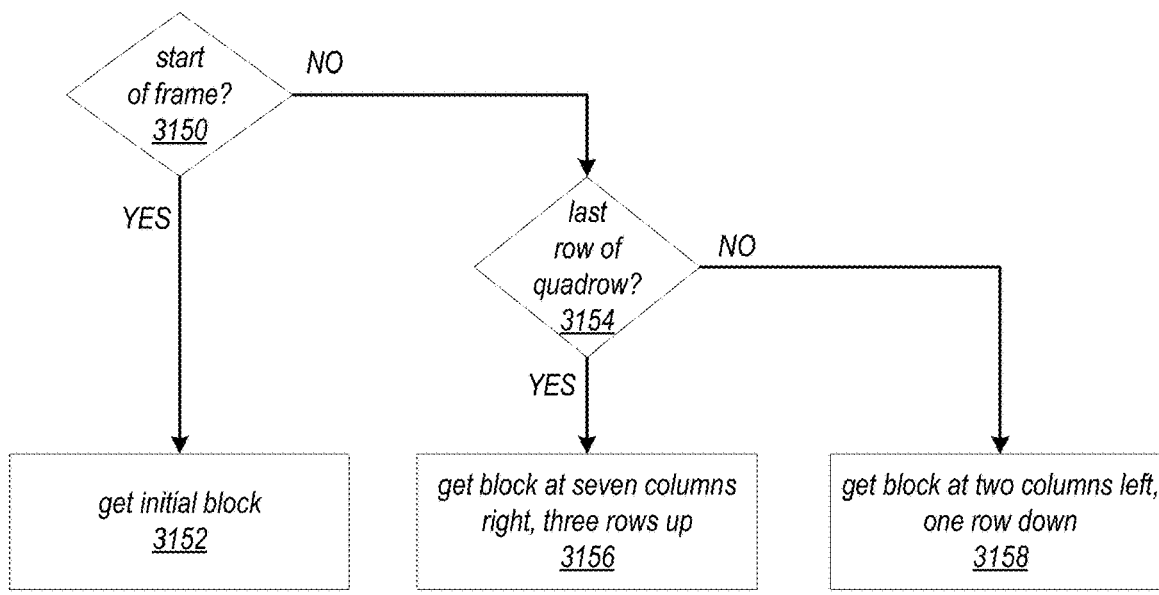

FIGS. 13A and 13B are high-level flowcharts of a knight's order processing method for a block processing pipeline, according to at least some embodiments. In FIG. 13A, as indicated at 3100, a next block is determined according to the algorithm for determining a next input block that is implemented by the knight's order processing method. As indicated at 3102, the block is input to the pipeline, for example from a memory via direct memory access (DMA). As shown by 3104, the input process of elements 3100 and 3102 continues as long as there are blocks to be processed. Each block that is input to the pipeline by elements 3100 and 3102 is processed in the pipeline, as indicated at 3106. Each block is initially input to a first stage of the pipeline, processed, output to a second stage, processed, and so on. When a block moves from a stage to a next stage of the pipeline, the stage can begin processing the next block in the pipeline. Thus, the input blocks move through the stages of the pipeline, with each stage processing one block at a time. As indicated at 3108, once a block has been processed by a last stage of the pipeline, the processed block is output, for example to a memory via direct memory access (DMA).

FIG. 13B is a flowchart of an example algorithm for determining a next input block that that may be implemented by the knight's order processing method, and expands on element 3100 of FIG. 13A. FIG. 13B assumes that the frame is divided into quadrows, and that the algorithm used to determine the next frame is two columns left, one row down (−2,+1) if not on the bottom row of a quadrow, seven columns right, three rows up (+7,−3) if on the bottom row. However, other row groupings and/or spacing algorithms may be used. At 3150, if at the start of the frame, the method gets an initial block as indicated at 3152. If this is not the start of the frame, then at 3154, if this is the last row of the quadrow, the next block is seven columns right, three rows up, as indicated at 3156. If this is not the last row of the quadrow, the next block is two columns left, one row down, as indicated at 3158.

Caching Neighbor Data

One or more operations performed at stages of a block processing pipeline may depend on one or more of the neighbor blocks from the previous (or above) row of blocks such as the top neighbor, top-left neighbor, top-right neighbor, and top-right-right neighbor blocks, as well as on the left neighbor, as shown in FIG. 11. The knight's order processing method with quadrow constraints provides locality of neighbor information that may be leveraged to provide local caching of neighbor data at each stage of the pipeline in relatively small local buffers. In at least some embodiments, the local buffers may be implemented using SRAM (static random access memory) technology. However, the local buffers may be implemented using other memory technologies in some embodiments.

Note that blocks in the first column of a frame do not have a left or top-left neighbor, blocks in the last column do not have a top-right or top-right-right neighbor, and blocks in the next-to-last column do not have a top-right-right neighbor. Thus, for block processing methods that use information from these neighbor positions, the information in the local buffers for these neighbor positions relative to blocks in those columns is not valid and is not used in processing the blocks in those columns in the stages of the pipeline. In addition, there are no rows above the top row of the first quadrow, so the blocks in this row do not have top, top-left, top-right, and top-right-right neighbors.

In at least some embodiments of a block processing pipeline that implements the knight's order processing method, a first buffer of sufficient size to cache the C most recently processed blocks on the current quadrow may be implemented at each of one or more stages of the pipeline. This buffer may be referred to as the current quadrow buffer, and may, for example, be implemented as a circular FIFO buffer. In at least some embodiments, C may be determined such that the buffer includes an entry corresponding to the top-left neighbor of the current block at the stage according to the algorithm for determining a next block and the row group size used to constrain the knight's order method. The buffer may also include entries corresponding the top-right-right, left, top-right, and top neighbors for the current block according to the algorithm. When processing a block, a stage may access the current quadrow buffer to obtain neighbor information for the block if that block's neighbor information is valid in the current quadrow buffer. Note that some block processing methods may not require top-left neighbor information, and the current quadrow buffer may be smaller in these implementations.

When a stage completes processing of a block, the block's information is written to the last position in the current quadrow buffer, overwriting the entry at the position of the block's top-left neighbor, thus preparing the buffer for the next block to be processed at the stage. Note that, initially, at the beginning of a frame, there is no information in the current quadrow buffer as no blocks in the frame have been processed, so no block information will be overwritten in the buffer until the buffer is filled. When the next block is at the stage, the previous block's information in the buffer is the block's top-right-right neighbor information.

Figure 14:
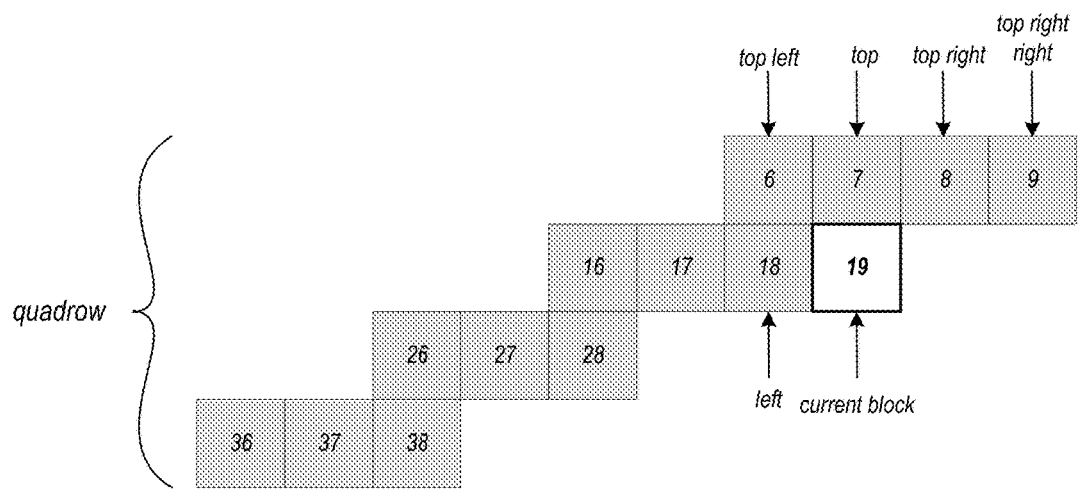
FIG. 14 shows a portion of a quadrow as processed in a pipeline according to the knight's order processing method that may be cached in the current quadrow buffer, according to at least some embodiments FIG. 15 graphically illustrates blocks in a current quadrow being processed according to the knight's order processing method, as well as neighbor blocks in the last row of the previous quadrow that may be cached in a previous quadrow buffer, according to at least some embodiments.

For example, using quadrow boundaries and the algorithm for determining a next block where the next block is two columns left, one row down if not on the bottom row of a quadrow, C=13 would be sufficient to include the top-left neighbor of the current block, as the spacing between the current block and its top-left neighbor is 13. FIG. 14 shows a portion of a quadrow as processed in a pipeline according to the knight's order processing method that may be cached in the current quadrow buffer, according to at least some embodiments. Block 19 represents a current block at a stage. The shaded blocks represent the 13 most recently processed blocks by the stage. Note that the farthest block from block 19 in time is its top-left neighbor (block 6), and the nearest block in time is its top-right-right neighbor (block 9).

For the blocks in the top row of a quadrow, information for neighbors in the row above is not in the current quadrow buffer. There are no rows above the top row of the first quadrow, and for all other quadrows the row above the top row is the bottom row of the previous quadrow. Thus, the current quadrow buffer includes the left neighbor information for all blocks in the top row of a quadrow (except for the first block, which has no left neighbor), but does not include the top-left, top, top-right, and top-right-right neighbor information for the blocks in the top row of the quadrow. To provide this neighbor information for blocks on the top rows of the quadrows, a second buffer of sufficient size to hold information for the required neighbor blocks from the last row of the previous quadrow may be implemented at one or more stages of the pipeline. This buffer may be referred to as the previous quadrow buffer, and may, for example, be implemented as a circular FIFO buffer. The number of entries in the previous quadrow buffer, as well as the particular neighbor blocks that are cached in the previous quadrow buffer, may be dependent on the requirements of the particular block processing method that is implemented by the block processing pipeline. In at least some embodiments, when processing a quadrow according to the knight's order processing method, information for each block on the bottom row of the quadrow may be written to an external memory, for example when the block is at a last stage of the pipeline. For each block in the top row of a quadrow, neighbor (e.g., top-right-right neighbor) data may be read from the external memory, for example at a first stage of the pipeline. This neighbor information may be passed down the pipeline to the other stages along with the corresponding block from the top row.

Figure 15:
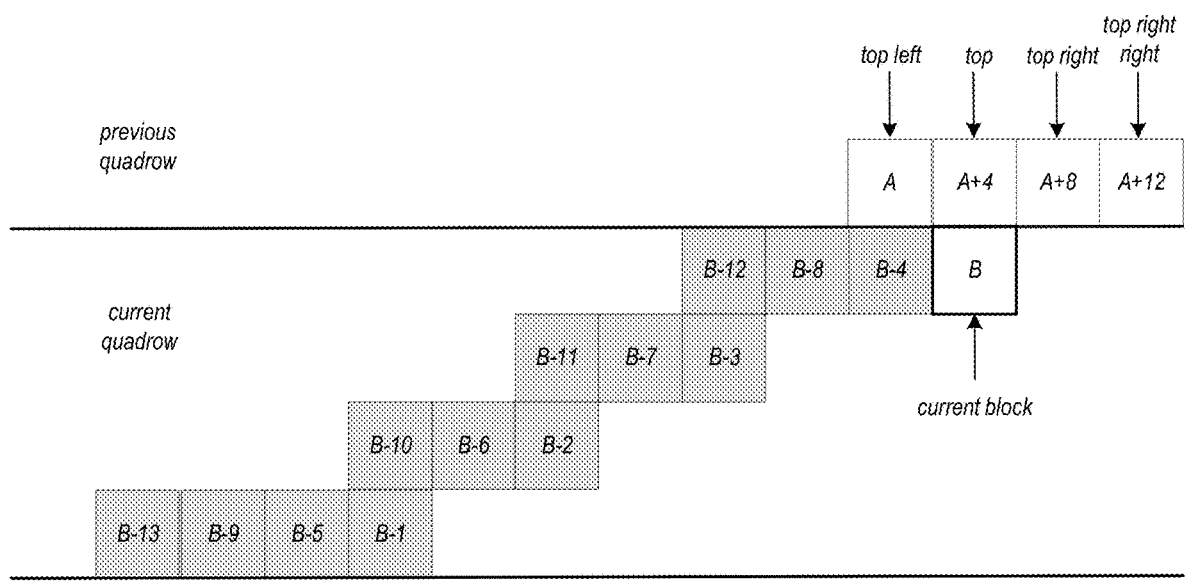

FIG. 15 graphically illustrates blocks in a current quadrow being processed according to the knight's order processing method, as well as neighbor blocks in the last row of the previous quadrow, according to at least some embodiments. Blocks A, A+4, A+8, and A+12 were processed on the previous quadrow according to the knight's order processing method. Block A was processed first, block A+4 was processed four cycles later, and so on. Block B represents a block on the current quadrow that is currently at a particular stage of the pipeline. Blocks B−1 (B minus 1) through B−13 (B minus 13) represent the thirteen blocks that were most recently processed at the stage in the current quadrow. Information from these blocks may be presently cached in the stage's current quadrow buffer, with B−1 as the most recent entry and B−13 as the oldest entry. B−4 is current block B's left neighbor. However, block B's top-left (block A), top (block A+4), top-right (block A+8), and top-right-right (block A+12) neighbors are on the bottom row of the previous quadrow, and are not included in the current quadrow buffer for block B. In at least some embodiments, to provide neighbor information for blocks on the top row of the current quadrow (e.g., top-left, top, top-right, and top-right-right neighbor information), a previous quadrow buffer may be implemented at each of one or more stages of the pipeline. When processing a quadrow, information for each block on the bottom row of the quadrow is written to a neighbor data structure in external memory, for example by a last stage of the pipeline. When processing blocks from the top row of a next quadrow, information for neighbor blocks in the bottom row of the previous quadrow is read from the external memory, for example by a first stage of the pipeline, and passed down the pipeline to other stages with the top row blocks. In at least some embodiments, information for the top-right-right neighbor block of a block in the top row is read from the external memory. In at least some embodiments, the previous quadrow buffer is a circular buffer, and an oldest entry in the previous quadrow buffer is replaced with the neighbor information that is read from the external memory. In various embodiments, the external memory to which blocks in the bottom row are written and from which neighbor block information is read may be a memory of the pipeline component that is external to the last stage, a memory of a video encoder that implements the pipeline, or a memory external to the video encoder. In some embodiments, however, the memory may be a local memory of the last stage of the pipeline. At least some embodiments may include an interlock mechanism to control the reads and writes to the external memory between rows to avoid overwriting the data in external memory.

Figure 16:
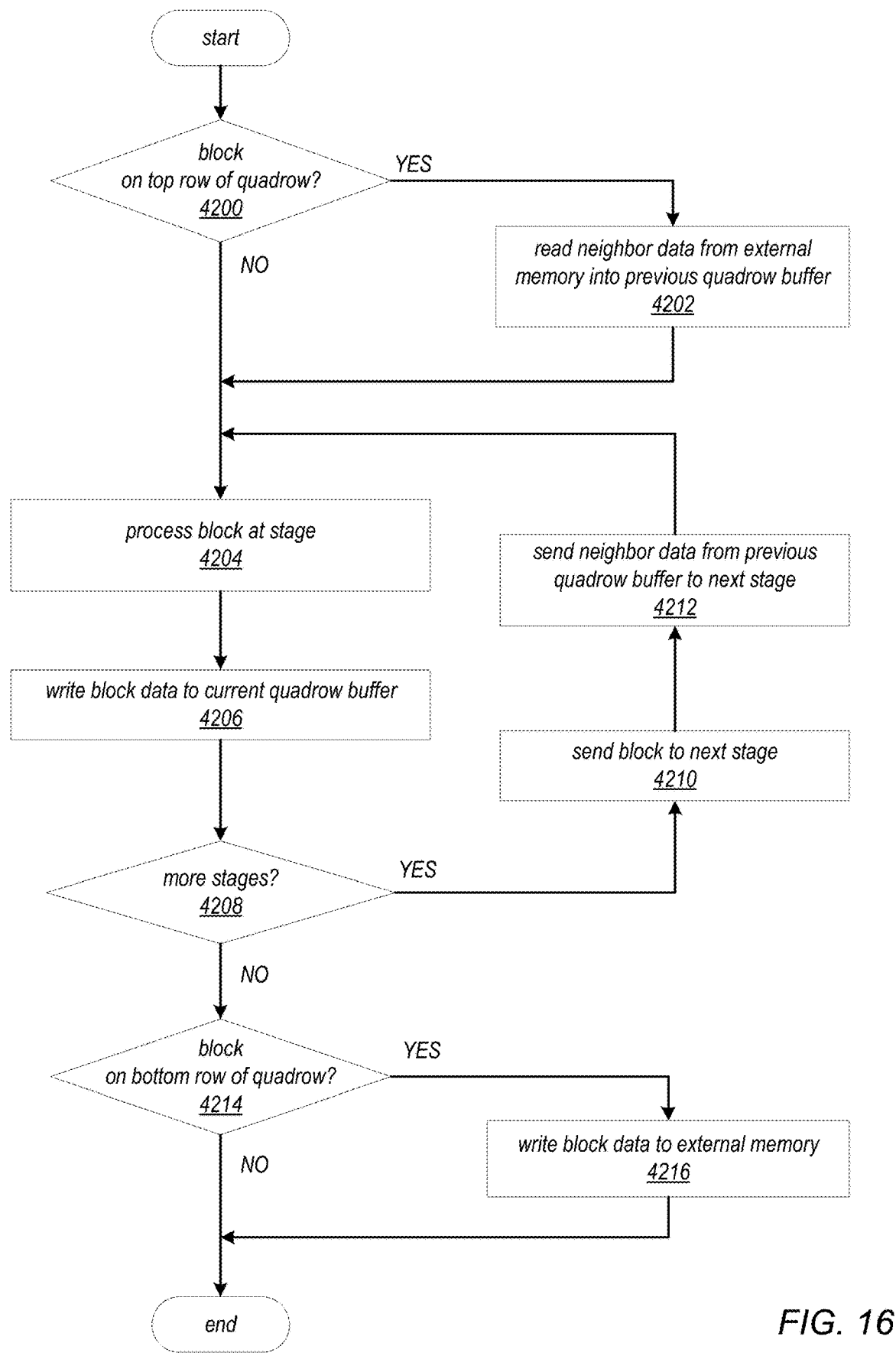
FIG. 16 is a flowchart of a method for processing blocks in a block processing pipeline in which neighbor data is cached in local buffers at the stages of the pipeline, according to at least some embodiments.

FIG. 16 is a flowchart of a method for processing blocks in a block processing pipeline in which neighbor data is cached in local buffers at the stages of the pipeline, according to at least some embodiments. For example, the method of FIG. 16 may be used at element 3106 of FIG. 13A to process blocks input to the pipeline according to the knight's order processing method as shown at elements 3100, 3102, and 3104 of FIG. 13A. In FIG. 16, a block is input to the pipeline. At 4200, at a first stage of the pipeline, if the block is on the top row of a quadrow, then neighbor data for the block may be read from external memory (for example, via DMA) into a previous quadrow buffer as indicated at 4202. In at least some embodiments, the neighbor data corresponds to the top-right-right neighbor of the current block on the bottom row of the previous quadrow. As indicated at 4204, the block is then processed at the current stage. If an operation at the stage requires neighbor information to process the block, the stage may use the neighbor information in the current quadrow buffer and/or in the previous quadrow buffer to perform the operation. If the block is on the top row of a quadrow, then at least some of the neighbor information is obtained from the previous quadrow buffer; otherwise, neighbor information may be obtained from the current quadrow buffer. As indicated at 4206, information about the current block may be written to the current quadrow buffer at the stage for use on subsequent blocks. The information may overwrite an oldest entry in the current quadrow buffer.

At 4208, if there are more stages, then the block may be sent to a next stage, as indicated at 4210. At 4212, neighbor information from the previous quadrow buffer may also be sent to the next stage. In at least some embodiments, this neighbor information is only sent to the next stage if the current block is on the top row of a quadrow. Elements 4204 through 4212 may be repeated until the block reaches and is processed by a last stage of the pipeline. At 4208, if there are no more stages, then processing of the block in the pipeline is done. At 4214, if the block is on the bottom row of a quadrow, then information for the block is written to an external memory (for example, via DMA) to be read as neighbor data for blocks in the top row of a next quadrow. In addition, all of the processed valid blocks are output as shown by element 3108 of FIG. 13A.

Example Pipeline Units

Figure 17A:
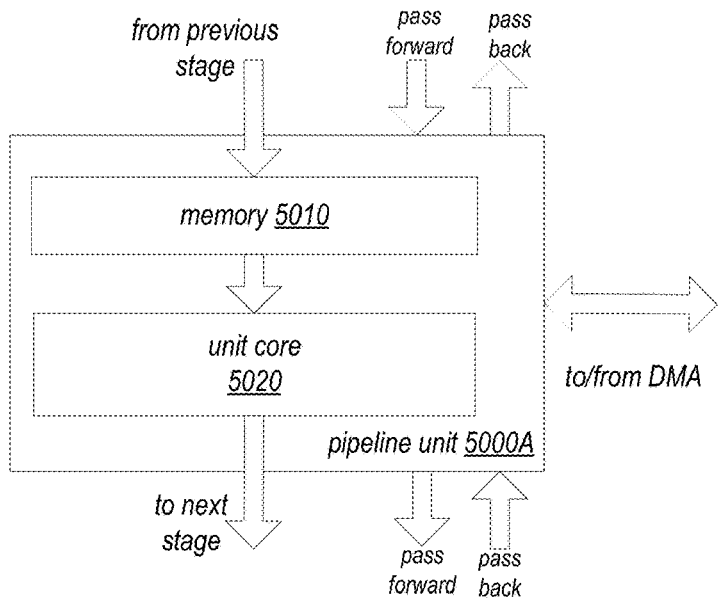
FIGS. 17A and 17B are block diagrams of example pipeline processing units that may be used at the stages of a block processing pipeline that implements one or more of the block processing methods and apparatus as described herein, according to at least some embodiments.
Figure 17B:
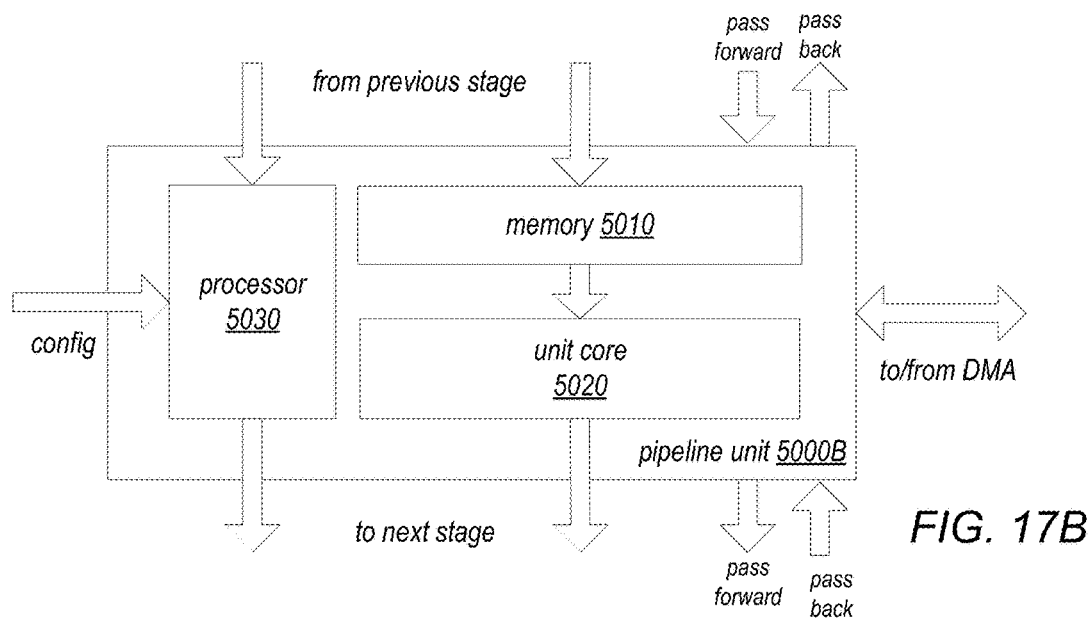
Figure 17C:
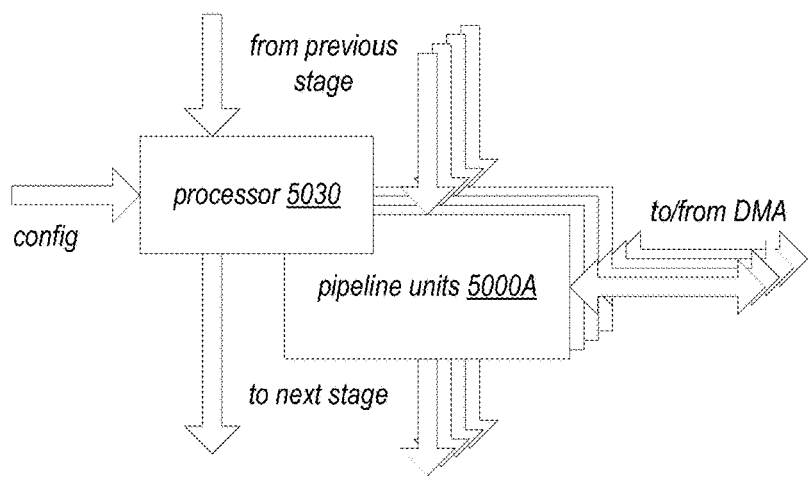
FIG. 17C shows that a single processor may be associated with a group of two or more pipeline units.

FIGS. 17A through 17C are block diagrams of example pipeline processing units that may be used at the stages of a block processing pipeline that implements one or more of the block processing methods and apparatus as described herein, according to at least some embodiments. For example, one or more of pipeline units 5000A and/or 5000B as shown in FIGS. 17A and 17B may be used at each stage of the example block processing pipeline shown in FIG. 18. Note that FIGS. 17A through 17C are not intended to be limiting; a pipeline processing unit may include more or fewer components and features than those shown in the Figures.

As shown in FIG. 17A, a pipeline unit 5000A may include at least a memory 5010 and a unit core 5020. Unit core 5020 may be a component (e.g., a circuit) that is configured to perform a particular operation on or for a block, or a portion of a block, at a particular stage of the block processing pipeline. Memory 5010 may, for example, be a double-buffered memory that allows the unit core 5020 to read and process data for a block from the memory 5010 while data for a next block is being written to the memory 5010 from a previous pipeline unit.

As shown in FIG. 17B, a pipeline unit 5000B, in addition to a memory 5010 and unit core 5020 as shown in FIG. 17A, may also include a processor 5030. Processor 5030 may, for example, be a mobile or M-class processor. The processors 5030 in pipeline units 5000B of a block processing pipeline may, for example, be used to control the block processing pipeline at block boundaries. The processors 5030 in pipeline units 5000B may be configurable, for example with low-level firmware microcode, to allow flexibility in algorithms that are implemented by the block processing pipeline for various applications. In at least some embodiments, a processor 5030 of a pipeline unit 5000B in the pipeline may be configured to receive data from a processor 5030 of a previous (upstream) pipeline unit 5000B and send data to a processor 5030 of a subsequent (downstream) pipeline unit 5000B. In addition, a processor 5030 of a pipeline unit 5000B at a last stage of the pipeline may be configured to send feedback data to a processor 5030 of a pipeline unit 5000B at a first stage of the pipeline.

As shown in FIGS. 17A and 17B, a pipeline unit 5000A or 5000B may be configured to access external memory, for example according to direct memory access (DMA). In addition, a pipeline unit 5000A or 5000B may be configured to pass information back to one or more previous (upstream) stages of the pipeline and/or to receive information passed back from one or more subsequent (downstream) stages of the pipeline. In addition, a pipeline unit 5000A or 5000B may be configured to pass information forward to one or more subsequent (downstream) stages of the pipeline and/or to receive information passed forward from one or more previous (upstream) stages of the pipeline.

As shown in FIG. 17C, two or more units 5000A as shown in FIG. 17A may be grouped together and configured to perform an operation in the pipeline. A single processor 5030 may be used to control and/or configure the pipeline units 5000A.

Example Block Processing Pipeline

FIG. 18 is a high-level block diagram of general operations in an example block processing method 6000 for H.264 encoding that may be implemented in stages by a block processing pipeline that may implement one or more of the block processing methods and apparatus as described herein, according to at least some embodiments. A block processing pipeline that implements the block processing method 6000 may, for example, be implemented as a component of an H.264 video encoder apparatus that is configured to convert input video frames from an input format into H.264/Advanced Video Coding (AVC) format as described in the H.264/AVC standard. The H.264/AVC standard is published by ITU-T in a document titled "ITU-T Recommendation H.264: Advanced video coding for generic audiovisual services", which may be referred to as the H.264 Recommendation. An example input video format is 1080p (1920× 1080 pixels, 2.1 megapixels) encoded in YCbCr color space. However, other input video formats may be encoded into H.264 using embodiments of the pipeline in a video encoder apparatus.

The video encoder apparatus may, for example, be implemented as an integrated circuit (IC) or as a subsystem on an IC such as a system-on-a-chip (SOC). In at least some embodiments, the video encoder apparatus may include at least a pipeline component, a processor component (e.g., a low-power multicore processor), and a bus subsystem or fabric that interconnects the functional components of the apparatus. The processor component of the video encoder apparatus may, for example, perform frame-level control of the pipeline such as rate control, perform pipeline configuration, and interface with application software via a driver. The pipeline component may implement multiple processing stages each configured to perform a portion or all of one or more of the operations as shown in FIG. 18, each stage including one or more processing units. At least one of the processing units in the pipeline may include a processor component (e.g., an M-class processor) that may, for example, configure parameters of the processing unit at the respective stage at the macroblock level. The video encoder apparatus may include other functional components or units such as memory components, as well as external interfaces to, for example, one or more video input sources and external memory. Example video input sources to the video encoder apparatus may include one or more of, but are not limited to, a video camera for raw video input processing, a decoder apparatus for re-encoding/transcoding, a flash or other memory, and a JPEG decoder. An example video encoder apparatus is illustrated in FIG. 17. An example SOC that includes a video encoder apparatus is illustrated in FIG. 18. While embodiments are generally described in relation to hardware implementations of a block processing pipeline that implements the block processing method 6000 with knight's order processing, note that the block processing method 6000 with knight's order processing may be implemented by a block processing pipeline implemented in software.

A pipeline that implements the method 6000 as shown in FIG. 18 may process 16×16 pixel macroblocks from input video frames according to the H.264 standard, each macroblock including two or more blocks or partitions that may be processed separately at stages of the pipeline. The input video frames may, for example, be encoded in YCbCr color space; each macroblock may be composed of separate blocks of chroma and luma elements that may be processed separately at the stages of the pipeline. A pipeline that implements the block processing method 6000 may receive input macroblocks from and output processed macroblocks to a memory. The memory may include memory of the video encoder apparatus and/or memory external to the video encoder apparatus. In at least some embodiments, the memory may be accessed by the pipeline as necessary, for example via direct memory access (DMA). In at least some embodiments, the memory may be implemented as a multi-level memory with a cache memory implemented between the pipeline and an external memory. For example, in some implementations, one or more quadrows may be read from an external memory and cached to the cache memory for access by the pipeline to reduce the number of reads to an external memory.

The general operations of the example H.264 video encoder method 6000 as shown in FIG. 18 that may be performed in stages by a pipeline, as well as general data flow through the pipeline, are briefly described below. Each of the general operations of the method 6000 may be implemented by one or more pipeline units at one or more stages of the pipeline. Example pipeline units are illustrated in FIGS. 17A through 17C. Also note that each general operation shown in FIG. 18 may be subdivided into two or more operations that may be implemented by pipeline units at one, two, or more stages of the pipeline. However, two or more of the operations shown in FIG. 18 may be performed at the same stage of the pipeline. Each stage in the pipeline processes one macroblock at a time, and thus two or more of the operations may simultaneously operate on the same macroblock that is currently at the respective stage. Note that a pipeline may perform more, fewer, or other operations than those shown in FIG. 18 and described below.

Macroblock Input

In at least some embodiments, macroblock input 6002 may be performed by an initial stage of the pipeline. In at least some embodiments, macroblock input 6002 receives luma and chroma pixels from a memory, for example via DMA, computes statistics on input pixels that are used by firmware in downstream stages of the pipeline, and buffers input macroblocks to enable firmware look ahead. The input macroblock pixel data and corresponding statistics are buffered and sent to one or more downstream stages of the pipeline that implement intra-frame and inter-frame estimation 6010 operations. In at least some embodiments, an input buffer of up to 16 macroblocks is maintained for input pixels and statistics. In at least some embodiments, the macroblock pixel data and corresponding statistics may be input to downstream stages of the pipeline according to a knight's order input algorithm as previously described in the section titled *Knight's order processing*.

In at least some embodiments, macroblock input 6002 reads neighbor data from the bottom row of a previous quadrow from memory at quadrow boundaries and passes the neighbor data to at least one downstream stage.

Intra-Frame and Inter-Frame Estimation

Intra-frame and inter-frame estimation 6010 operations may determine blocks of previously encoded pixels to be used in encoding macroblocks input to the pipeline. In H.264 video encoding, each macroblock can be encoded using blocks of pixels that are already encoded within the current frame. The process of determining these blocks may be referred to as intra-frame estimation, or simply intra-estimation. However, macroblocks may also be encoded using blocks of pixels from one or more previously encoded frames (referred to as reference frames). The process of finding matching pixel blocks in reference frames may be referred to as inter-frame estimation, or more generally as motion estimation. Intra-frame and inter-frame estimation 6010 operations may be subdivided into two or more sub-operations that may be performed at one, two, or more stages of the pipeline, with one or more components or pipeline units at each stage configured to perform a particular sub-operation.

In at least some embodiments, macroblock input 6002 reads neighbor data from the bottom row of a previous quadrow from memory at quadrow boundaries and passes the neighbor data to intra-frame and inter-frame estimation 6010, for example to an intra-frame estimation component. In addition, motion compensation and reconstruction 6030, for example a luma reconstruction component, may pass neighbor data as feedback to intra-frame and inter-frame estimation 6010, for example to the intra-frame estimation component.

Motion Estimation

In at least some embodiments, to perform motion estimation, the pipeline may include one instance of a motion estimation engine for each reference frame to be searched. Each motion estimation engine searches only one reference frame. In at least some embodiments, each motion estimation engine may include a low resolution motion estimation component, a full pixel motion estimation component, and a subpixel motion estimation component. In at least some embodiments, the three components of each of the motion estimation engines may be implemented at different stages of the pipeline. In at least some embodiments, each motion estimation engine may also include a memory component that reads and stores reference frame data from a memory as needed. In at least some embodiments, a single instance of a processor manages all instances of the motion estimation engine. In at least some embodiments, the processor may determine one or more candidates using predicted and co-located motion vectors and input the candidates to the full pixel motion estimation components of the motion estimation engines.

In at least some embodiments, the low resolution motion estimation component of each motion estimation engine performs an exhaustive search on a scaled-down, low resolution version of a respective reference frame to generate candidates. In at least some embodiments, the full pixel motion estimation component performs a search on full size pixels using candidates from the low resolution motion estimation component. In at least some embodiments, the subpixel motion estimation component performs a search on half and quarter pixels using best candidates received from the full pixel motion estimation component. In some embodiments, full pixel motion estimation and subpixel motion estimation may be disabled based on results of a direct mode estimation performed at an upstream stage of the pipeline. In at least some embodiments, each motion estimation engine outputs results data to mode decision 6020.

In at least some embodiments, motion estimation may also include a direct mode estimation component that receives co-located and spatial motion vector data and computes a direct/skip mode cost, which it provides to mode decision 6020. Based on the results, the direct mode estimation component may disable full pixel motion estimation and subpixel motion estimation. In at least some embodiments, a stage downstream of motion estimation in the pipeline may calculate motion vector predictors, for example the exact motion vector predictor for various partition sizes, and feed the motion vector predictors back to the motion estimation to be used in calculating the rate cost of each motion vector search point.

Intra Estimation

In at least some embodiments, an intra estimation component of the pipeline performs intra mode selection to determine blocks of pixels already encoded within the current frame that may be used in encoding a current macroblock. In at least some embodiments, the intra estimation component performs intra mode selection only for luma. In these embodiments, Chroma intra estimation is performed by a chroma reconstruction component at a downstream stage of the pipeline. In at least some embodiments, the intra estimation component may perform intra estimation independently for each of two or more blocks or partitions (e.g., 4×4, 8×8, 4×8, 8×4, 16×8, and/or 8×16 blocks) in a macroblock. For each block, prediction pixels are first extracted from neighbor blocks (neighbor blocks can be outside the current macroblock in the frame or within the current macroblock). For each prediction mode in the current block, the cost of the current mode is evaluated by creating a prediction block from neighbor pixels, computing a mode cost, and comparing the mode cost to a minimum cost for that block. Once all prediction modes are evaluated and the best mode is determined, reconstruction may be performed for the best mode so that reconstructed pixels can be used to predict future blocks within the macroblock. The intra estimation component may pass best intra mode information to mode decision 6020.

In at least some embodiments, macroblock input 6002 reads neighbor data from the bottom row of a previous quadrow from memory at quadrow boundaries and passes the neighbor data to the intra estimation component. In at least some embodiments, at least one downstream stage (e.g., a luma reconstruction component at a downstream stage) may pass neighbor data back to the intra estimation component.

Mode Decision

In at least some embodiments, mode decision 6020 may be implemented by a mode decision component at a stage of the pipeline that is downstream of the stage(s) that implement intra-frame and inter-frame estimation 6010 operations. However, in some embodiments, mode decision 6020 operations may be subdivided into two or more sub-operations that may be performed at one, two, or more stages of the pipeline, with one or more components or pipeline units at each stage configured to perform a particular sub-operation. In at least some embodiments, the mode decision 6020 component receives the best intra mode from intra estimation, direct/skip mode cost from direct mode estimation, and motion vector candidates from the motion estimation engines. In at least some embodiments, the mode decision component computes additional costs for bi-directional modes and determines the best macroblock type, including macroblock partitions, sub-partitions, prediction direction and reference frame indices. In at least some embodiments, the mode decision 6020 component also performs all motion vector prediction. The motion vector prediction results may be used when estimating motion vector rate during mode decision. In at least some embodiments, the motion vector prediction results may also be fed back from the mode decision 6020 component to motion estimation, for example for use in direct mode estimation and motion vector rate estimation.

Motion Compensation and Reconstruction

In at least some embodiments, motion compensation and reconstruction 6030 operations may be subdivided into two or more sub-operations that may be performed at one, two, or more stages of the pipeline, with one or more components or pipeline units at each stage configured to perform a particular sub-operation. For example, in some embodiments, motion compensation and reconstruction 6030 may be subdivided into luma motion compensation and reconstruction and chroma motion compensation and reconstruction. In at least some embodiments, each of these sub-operations of motion compensation and reconstruction 6030 may be performed by one or more components or pipeline units at one or more stages of the pipeline.

Luma Motion Compensation and Reconstruction

In at least some embodiments, a luma motion compensation component of the pipeline receives the best mode and corresponding motion vectors from mode decision 6020. As previously noted, each motion estimation engine may include a memory component that reads and stores reference frame data from a memory. If the best mode is inter-predicted, the luma motion compensation component requests reference frame macroblocks from the motion estimation engine corresponding to the motion vectors. The motion estimation engine returns subpixel interpolated 4×4 or 8×8 blocks depending on the request size. The luma motion compensation component then combines the blocks into prediction macroblocks. The luma motion compensation component then applies a weighted prediction to the prediction macroblocks to create the final macroblock predictor that is then passed to the luma reconstruction component.

In at least some embodiments, a luma reconstruction component of the pipeline performs macroblock reconstruction for luma, including intra prediction (in at least some embodiments, the luma motion compensation component performs inter prediction), forward transform and quantization (FTQ), and inverse transform and quantization (ITQ).

In at least some embodiments, based on the best mode from mode decision 6020, either an inter prediction macroblock is passed from the luma motion compensation component or intra prediction is performed by the luma reconstruction component to generate a prediction block. In intra mode, the prediction is performed in block (scan) order since reconstructed pixels from neighbor blocks are needed for prediction of future blocks. The input block is subtracted from the prediction block to generate a residual block. This residual pixel data is transformed and quantized by an FTQ technique implemented by the luma reconstruction component. The coefficient data is sent to an ITQ technique implemented by the luma reconstruction component, and may also be sent downstream to CAVLC encoding. The ITQ technique generates a reconstructed residual pixel block. The prediction block is added to the residual block to generate the reconstructed block. Reconstructed pixels may be passed downstream to a deblocking filter. In at least some embodiments, reconstructed pixels may also be passed back to an intra-frame estimation component of intra-frame and inter-frame estimation 1410 for prediction of future blocks inside the current macroblock.

Chroma Motion Compensation and Reconstruction

In at least some embodiments, chroma reconstruction is performed in two stages. In the first stage, chroma reference blocks needed for inter prediction are read from memory based on input macroblock type, motion vectors, and reference frame index. Subpixel interpolation and weighted prediction is then applied to generate a prediction macroblock. In the second stage, chroma intra prediction and chroma intra/inter FTQ/ITQ is performed. This allows one additional pipeline stage to load chroma prediction pixel data. Since chroma pixels are not searched by motion estimation, the chroma prediction data is read from external memory and may have large latency. In at least some embodiments, a chroma motion compensation component performs the first stage, while a chroma reconstruction component performs the second stage.

In at least some embodiments, the chroma motion compensation component generates a prediction block including subpixel interpolation for Cb and Cr chroma blocks; the size is based on the partition size and chroma formats. A full size chroma block is 8×8, 8×16, or 16×16 pixels for chroma formats 4:2:0, 4:2:2 and 4:4:4, respectively. In at least some embodiments, the chroma motion compensation component may prefetch and cache chroma prediction pixels from an external (to the pipeline) memory. In at least some embodiments, reference data may be read based on mode decision 6020 results. The chroma motion compensation component performs subpixel interpolation to generate a prediction block. Mode decision 6020 provides the macroblock type and sub-types, reference frame index per partition, and corresponding motion vectors. The prediction is output to the chroma reconstruction component.

In at least some embodiments, the chroma reconstruction component performs chroma prediction, chroma intra estimation and chroma reconstruction for inter and intra modes. For chroma formats 4:2:0 and 4:2:2, intra chroma estimation and prediction is performed. In at least some embodiments, chroma intra estimation is performed at this stage rather than at intra-frame and inter-frame estimation 6010 so that reconstructed pixels can be used during the estimation process. In at least some embodiments, if the best mode is in intra, intra chroma estimation may be performed. based on the best intra chroma mode, and intra prediction may be performed using one of four intra chroma modes. For inter macroblocks, inter chroma prediction pixels are received from chroma motion compensation. For chroma format 4:4:4, the luma intra prediction modes are used to generate the chroma block prediction, and inter chroma prediction is performed in the same manner as for luma. Therefore, chroma reconstruction conceptually includes 4:2:0 and 4:2:2 chroma reconstruction and luma reconstruction used to reconstruct chroma in 4:4:4 chroma format.

CAVLC Encode and Deblocking

In at least some embodiments, CAVLC encoding and deblocking may be performed by one or more components at a last stage of the pipeline. In at least some embodiments, a deblocking filter component of the pipeline receives reconstructed luma and chroma pixels from the chroma reconstruction component and performs deblocking filtering according to the H.264 Recommendation. Results may be output to a memory.

In at least some embodiments, a CAVLC encode component of the pipeline receives at least luma and chroma quantized coefficients, neighbor data, and chroma reconstruction results from the chroma reconstruction component and generates a CAVLC (context-adaptive variable-length coding) encoded output stream to a memory.

In at least some embodiments, the deblocking filter component and the CAVLC encode component write neighbor data for the bottom row of a quadrow to a memory at quadrow boundaries. For the top row of a next quadrow, macroblock input 6002 may then read this neighbor data from the memory at quadrow boundaries and pass the neighbor data to at least one downstream stage of the pipeline.

Transcoder

In at least some embodiments, a transcoding operation may be performed by a transcoder 6050. The transcoder may be implemented as a functional component of the pipeline or as a functional component that is external to the pipeline. In at least some embodiments, the transcoder 6050 may perform a memory-to-memory conversion of a CAVLC (context-adaptive variable-length coding) encoded stream output by the pipeline to a CABAC (context-adaptive binary arithmetic coding) encoded stream.

In at least some embodiments, the pipeline may encode in an order other than scan order, for example knight's order as previously described herein. However, ultimately, the H.264 video encoder's encoded bit stream should be transmitted in conventional macroblock scan order. In at least some embodiments, re-ordering the macroblock output from knight's order to scan order is accomplished by the CAVLC encode component writing encoded data to four different output buffers, each output buffer corresponding to a macroblock row. At the end of a quadrow, each row buffer will contain a scan order stream of encoded macroblocks for a respective row. Transcoder 6050 handles stitching the start and end of each row to generate a continuous stream at macroblock row boundaries. In at least some embodiments, the pipeline may embed metadata in the CAVLC output stream to facilitate stitching of the rows by the transcoder 6050.

Example Video Encoder Apparatus

FIG. 19 is a block diagram of an example video encoder apparatus 7000, according to at least some embodiments. The video encoder apparatus 7000 may, for example, be implemented as an integrated circuit (IC) or as a subsystem on an IC such as a system-on-a-chip (SOC). In at least some embodiments, the video encoder apparatus 7000 may include a pipeline 7040 component, a processor 7010 component (e.g., a low-power multicore processor), a memory management unit (MMU) 7020, DMA 7030, and an interconnect 7050 such as a bus subsystem or fabric that interconnects the functional components of the apparatus. The processor 7010 component of the video encoder apparatus 7000 may, for example, perform frame-level control of the pipeline 7040 such as rate control, perform pipeline 7040 configuration including configuration of individual pipeline units within the pipeline 7040, and interface with application software via a driver, for example for video encoder 7000 configuration. The MMU 7020 may serve as an interface to external memory, for example for streaming video input and/or output. Pipeline 7040 component may access memory through MMU 7020 via DMA 7030. In some embodiments, the video encoder apparatus 7000 may include other functional components or units not shown in FIG. 19, or fewer functional components than those shown in FIG. 19. An example block processing method that may be implemented by pipeline 7040 component is shown in FIG. 18. An example a system-on-a-chip (SOC) that may include at least one video encoder apparatus 7000 is illustrated in FIG. 20.

Example System on a Chip (SOC)

Figure 20:
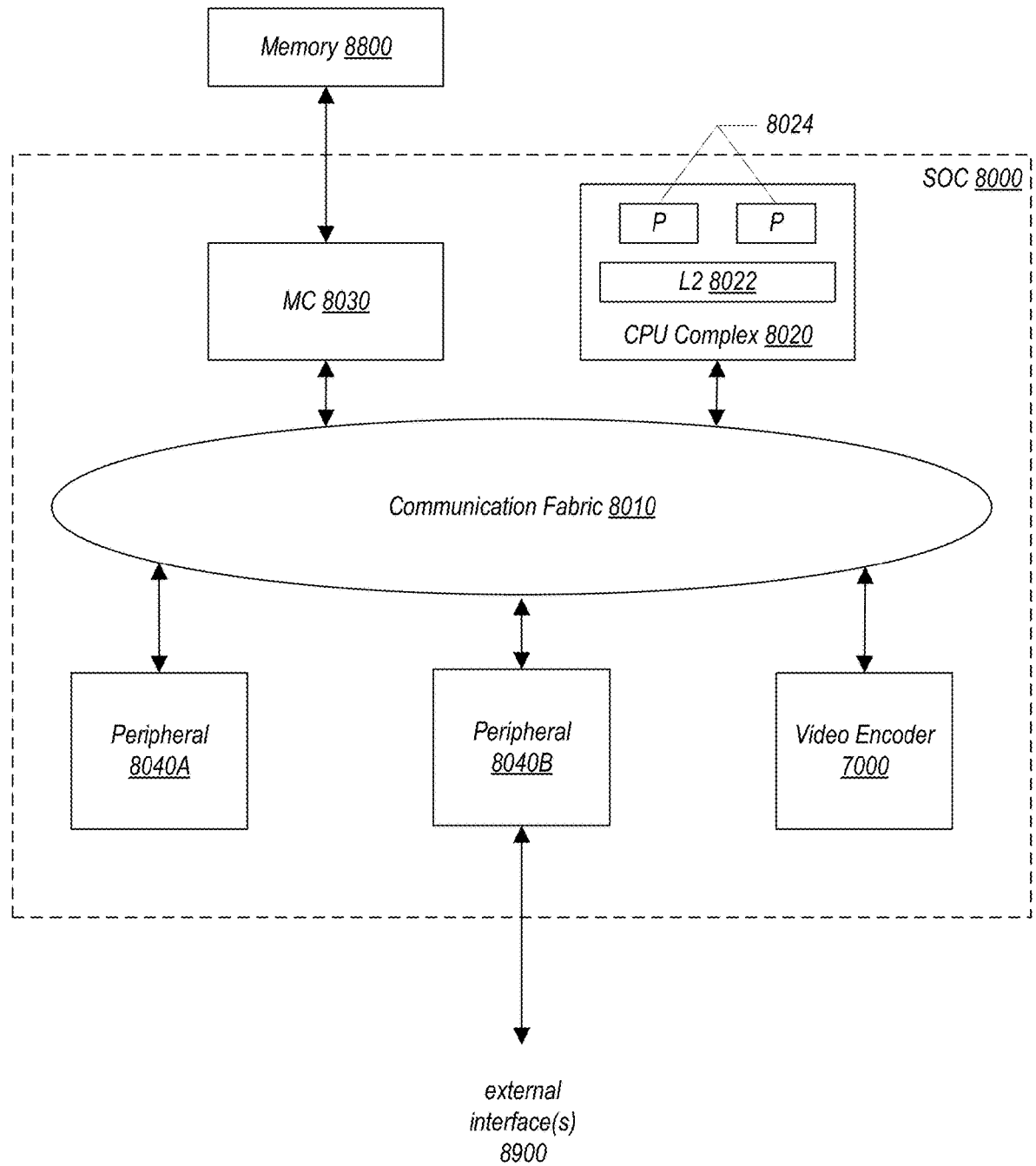
FIG. 20 is a block diagram of one embodiment of a system on a chip (SOC).

Turning now to FIG. 20, a block diagram of one embodiment of a system-on-a-chip (SOC) 8000 that may include at least one instance of a video encoder apparatus including a block processing pipeline that may implement one or more of the block processing methods and apparatus as illustrated in FIGS. 3 through 19. SOC 8000 is shown coupled to a memory 8800. As implied by the name, the components of the SOC 8000 may be integrated onto a single semiconductor substrate as an integrated circuit "chip." In some embodiments, the components may be implemented on two or more discrete chips in a system. However, the SOC 8000 will be used as an example herein. In the illustrated embodiment, the components of the SOC 8000 include a central processing unit (CPU) complex 8020, on-chip peripheral components 8040A-8040B (more briefly, "peripherals"), a memory controller (MC) 8030, a video encoder 7000 (which may itself be considered a peripheral component), and a communication fabric 8010. The components 8020, 8030, 8040A-8040B, and 7000 may all be coupled to the communication fabric 8010. The memory controller 8030 may be coupled to the memory 8800 during use, and the peripheral 8040B may be coupled to an external interface 8900 during use. In the illustrated embodiment, the CPU complex 8020 includes one or more processors (P) 8024 and a level two (L2) cache 8022.

The peripherals 8040A-8040B may be any set of additional hardware functionality included in the SOC 8000. For example, the peripherals 8040A-8040B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 8900 external to the SOC 8000 (e.g. the peripheral 8040B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

More particularly in FIG. 20, SOC 8000 may include at least one instance of a video encoder 7000 component, for example a video encoder 7000 as illustrated in FIG. 19 that includes a block processing pipeline 7040 component that implements a block processing method 6000 as illustrated in FIG. 18. Video encoder 7000 may be an H.264 video encoder apparatus that may be configured to convert input video frames from an input format into H.264/Advanced Video Coding (AVC) format as described in the H.264/AVC standard. The block processing pipeline 7040 may implement one or more of the block processing methods and apparatus as described herein in relation to FIGS. 3 through 18.

The CPU complex 8020 may include one or more CPU processors 8024 that serve as the CPU of the SOC 8000. The CPU of the system includes the processor(s) that execute the main control software of the system, such as an operating system. Generally, software executed by the CPU during use may control the other components of the system to realize the desired functionality of the system. The processors 8024 may also execute other software, such as application programs. The application programs may provide user functionality, and may rely on the operating system for lower level device control. Accordingly, the processors 8024 may also be referred to as application processors. The CPU complex 8020 may further include other hardware such as the L2 cache 8022 and/or and interface to the other components of the system (e.g. an interface to the communication fabric 8010). Generally, a processor may include any circuitry and/or microcode configured to execute instructions defined in an instruction set architecture implemented by the processor. The instructions and data operated on by the processors in response to executing the instructions may generally be stored in the memory 8800, although certain instructions may be defined for direct processor access to peripherals as well. Processors may encompass processor cores implemented on an integrated circuit with other components as a system on a chip (SOC 8000) or other levels of integration. Processors may further encompass discrete microprocessors, processor cores and/or microprocessors integrated into multichip module implementations, processors implemented as multiple integrated circuits, etc.

The memory controller 8030 may generally include the circuitry for receiving memory operations from the other components of the SOC 8000 and for accessing the memory 8800 to complete the memory operations. The memory controller 8030 may be configured to access any type of memory 8800. For example, the memory 8800 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 8030 may include queues for memory operations, for ordering (and potentially reordering) the operations and presenting the operations to the memory 8800. The memory controller 8030 may further include data buffers to store write data awaiting write to memory and read data awaiting return to the source of the memory operation. In some embodiments, the memory controller 8030 may include a memory cache to store recently accessed memory data. In SOC implementations, for example, the memory cache may reduce power consumption in the SOC by avoiding re-access of data from the memory 8800 if it is expected to be accessed again soon. In some cases, the memory cache may also be referred to as a system cache, as opposed to private caches such as the L2 cache 8022 or caches in the processors 8024, which serve only certain components. Additionally, in some embodiments, a system cache need not be located within the memory controller 8030.

In an embodiment, the memory 8800 may be packaged with the SOC 8000 in a chip-on-chip or package-on-package configuration. A multichip module configuration of the SOC 8000 and the memory 8800 may be used as well. Such configurations may be relatively more secure (in terms of data observability) than transmissions to other components in the system. Accordingly, protected data may reside in the memory 8800 unencrypted, whereas the protected data may be encrypted for exchange between the SOC 8000 and external endpoints.

The communication fabric 8010 may be any communication interconnect and protocol for communicating among the components of the SOC 8000. The communication fabric 8010 may be bus-based, including shared bus configurations, cross bar configurations, and hierarchical buses with bridges. The communication fabric 8010 may also be packet-based, and may be hierarchical with bridges, cross bar, point-to-point, or other interconnects.

It is noted that the number of components of the SOC 8000 (and the number of subcomponents for those shown in FIG. 20, such as within the CPU complex 8020) may vary from embodiment to embodiment. There may be more or fewer of each component/subcomponent than the number shown in FIG. 20.

Example System

Figure 21:
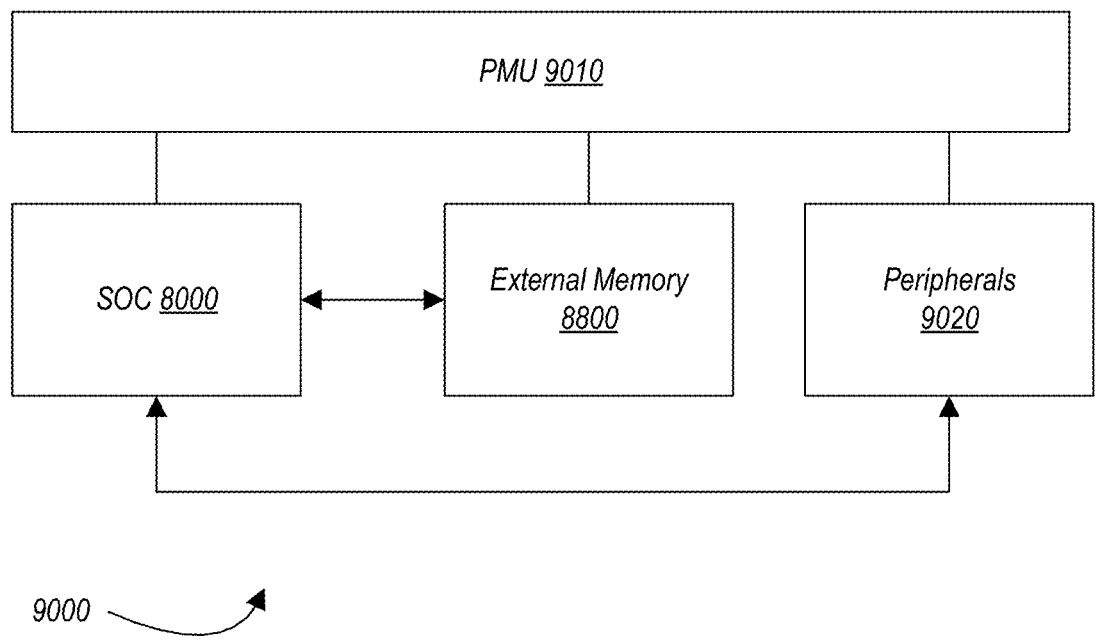
FIG. 21 is a block diagram of one embodiment of a system.

FIG. 21 a block diagram of one embodiment of a system 9000. In the illustrated embodiment, the system 9000 includes at least one instance of the SOC 8000 coupled to one or more external peripherals 9020 and the external memory 8800. A power management unit (PMU) 9010 is provided which supplies the supply voltages to the SOC 8000 as well as one or more supply voltages to the memory 8800 and/or the peripherals 9020. In some embodiments, more than one instance of the SOC 8000 may be included (and more than one memory 8800 may be included as well).

The peripherals 9020 may include any desired circuitry, depending on the type of system 9000. For example, in one embodiment, the system 9000 may be a mobile device (e.g. personal digital assistant (PDA), smart phone, etc.) and the peripherals 9020 may include devices for various types of wireless communication, such as wifi, Bluetooth, cellular, global positioning system, etc. The peripherals 9020 may also include additional storage, including RAM storage, solid state storage, or disk storage. The peripherals 9020 may include user interface devices such as a display screen, including touch display screens or multitouch display screens, keyboard or other input devices, microphones, speakers, etc. In other embodiments, the system 9000 may be any type of computing system (e.g. desktop personal computer, laptop, workstation, net top etc.).

The external memory 8800 may include any type of memory. For example, the external memory 8800 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 8800 may include one or more memory modules to which the memory devices are mounted, such as single inline memory modules (SIMMs), dual inline memory modules (DIMMs), etc. Alternatively, the external memory 8800 may include one or more memory devices that are mounted on the SOC 8000 in a chip-on-chip or package-on-package implementation.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
    a block processing pipeline comprising a plurality of stages each configured to perform one or more operations on a block of pixels from a frame passing through the pipeline;
    a first motion estimation stage of the block processing pipeline configured to perform motion estimation for a current block with respect to a reference frame to generate candidate motion vectors corresponding to partitions of the current block at one or more of a plurality of partition sizes, each candidate motion vector indicating a position in the reference frame of a match for a respective partition of the current block; and
    a second motion estimation stage of the block processing pipeline configured to perform motion estimation for the current block with respect to the reference frame to generate refined motion vectors for the current block at two or more of the plurality of partition sizes using the generated candidate motion vectors of the first motion estimation stage as seeds in searches for the refined motion vectors, wherein at least one of the two or more of the plurality of partition sizes used to generate the refined motion vectors in the second motion estimation stage is different from the one or more of the plurality of partition sizes corresponding to the candidate motion vectors generated in the first motion estimation stage;
    wherein the first motion estimation stage and the second motion estimation stage are different stages of the block processing pipeline.

2. The apparatus as recited in claim 1, wherein the second motion estimation stage is further configured to output the refined motion vectors for the current block to a downstream stage of the pipeline.

3. The apparatus as recited in claim 1, wherein the first motion estimation stage is a full pixel motion estimation stage that performs the motion estimation at full pixel resolution to generate the candidate motion vectors, and wherein the second motion estimation stage is a subpixel motion estimation stage that performs the motion estimation at subpixel resolution to generate the refined motion vectors.

4. The apparatus as recited in claim 3, further comprising a low resolution motion estimation stage of the block processing pipeline located upstream of the full pixel motion estimation stage and configured to perform motion estimation at a low resolution to generate initial motion vectors that are passed to the full pixel motion estimation stage, wherein the initial motion vectors are used as seeds for the motion estimation performed at full pixel resolution by the full pixel motion estimation stage to generate the candidate motion vectors for the subpixel motion estimation stage.

5. The apparatus as recited in claim 1, wherein the second motion estimation stage is further configured to evaluate one or more metrics for the candidate motion vectors to determine which of the candidate motion vectors to use as seeds in searches for other partition sizes, wherein a candidate motion vector is not used as a seed in searches for other partition sizes if at least one metric exceeds a threshold for the at least one metric.

6. The apparatus as recited in claim 5, wherein the metrics include distortion metrics corresponding to the candidate motion vectors, wherein the distortion metric for a given motion vector indicates difference between a respective partition of the current block and its match in the reference frame.

7. The apparatus as recited in claim 5, wherein the metrics include similarity of a candidate motion vector to one or more other candidate motion vectors.

8. The apparatus as recited in claim 1, wherein the second motion estimation stage is tunable to specify which of the one or more partition sizes are to be upsized for use as seeds in searches for one or more other partition sizes.

9. A method, comprising:
    performing, by one or more hardware computing devices:
        inputting blocks of pixels from an input frame to a block processing pipeline comprising a plurality of stages, each stage configured to perform one or more operations on blocks of pixels passing through the pipeline;
        generating, by a first stage of the pipeline, candidate motion vectors for a current block with respect to a reference frame according to searches of the reference frame performed for one or more partition sizes; and
        generating, by a next stage of the pipeline, refined motion vectors for the current block with respect to the reference frame according to searches of the reference frame performed for a plurality of partition sizes, wherein the generated candidate motion vectors are used as seeds in searching for the refined motion vectors, and wherein at least one of the plurality of partition sizes used in generating the refined motion vectors in the next stage is different from the one or more partition sizes corresponding to the candidate motion vectors generated in the first stage;
        wherein the first stage and the next stage are different stages of the block processing pipeline.

10. The method as recited in claim 9, further comprising outputting the refined motion vectors for the current block to a downstream stage of the pipeline.

11. The method as recited in claim 9, wherein the candidate motion vectors are generated according to searches of the reference frame performed at full pixel resolution.

12. The method as recited in claim 11, wherein the refined motion vectors are generated according to searches of the reference frame performed at subpixel resolution.

13. The method as recited in claim 12, further comprising, prior to said generating the candidate motion vectors, performing motion estimation at a low resolution to generate initial motion vectors, wherein the initial motion vectors are used as seeds for the full pixel resolution searches.

14. The method as recited in claim 9, further comprising evaluating one or more metrics for the candidate motion vectors to determine which of the candidate motion vectors to use as seeds in searches for one or more others of the plurality of partition sizes, wherein a candidate motion vector is not used as a seed in searches for other partition sizes if at least one metric exceeds a threshold for the metric.

15. The method as recited in claim 14, wherein the metrics include distortion metrics corresponding to the candidate motion vectors, wherein the distortion metric for a given motion vector indicates difference between a respective partition of the current block and its match in the reference frame.

16. The method as recited in claim 14, wherein the metrics include similarity of a candidate motion vector to one or more other candidate motion vectors.

17. The method as recited in claim 9, wherein said generating the refined motion vectors comprises:
   determining best candidate motion vectors at each of the one or more partition sizes;
   promoting the best candidate motion vectors to a largest partition size; and
   using the promoted best candidate motion vectors as seeds in the searches of the reference frame performed for the plurality of partition sizes.

18. A device, comprising:
   a memory; and
   an apparatus configured to process video frames and to store the processed video frames as frame data to the memory, the apparatus comprising a block processing pipeline that implements a plurality of stages each configured to perform one or more operations on a block of pixels from a frame passing through the pipeline;
   wherein one or more stages of the block processing pipeline are each configured to:
      receive, from an upstream stage of the pipeline, candidate motion vectors corresponding to partitions of a current block with respect to a reference frame, each candidate motion vector indicating a position in the reference frame of a match for a respective partition of the current block, wherein the candidate motion vectors correspond to partitions of one or more of a plurality of partition sizes;
      perform motion estimation for the current block with respect to the reference frame to generate motion vectors for the current block at two or more of the plurality of partition sizes, wherein the received candidate motion are used as seeds in searches for the motion vectors, and wherein at least one of the two or more of the plurality of partition sizes used to generate the motion vectors in the one or more stages is different from the one or more of a plurality of partition sizes corresponding to the candidate motion vectors received from the upstream motion estimation stage; and
      output the motion vectors for the current block to at least one downstream stage of the pipeline.

19. The device as recited in claim 18, wherein the one or more stages of the block processing pipeline are each further configured to:
   generate distortion metrics for the motion vectors, wherein the distortion metric for a motion vector indicates difference between a respective partition of the current block and its match in the reference frame; and
   output the distortion vectors for the current block to the at least one downstream stage of the pipeline.

20. The device as recited in claim 19, wherein the distortion metrics are generated according to a Sum of Absolute Differences (SAD) algorithm or a Sum of Absolute Transformed Differences (SATD) algorithm.

21. The device as recited in claim 18, wherein the one or more stages are components of a motion estimation module of the block processing pipeline.

22. The device as recited in claim 21, wherein the block processing pipeline includes two or more block processing modules, each block processing module configured to perform motion estimation for the blocks of pixels from the frame with respect to a different reference frame.

* * * * *